US012647755B2

(12) United States Patent
Rao et al.

(10) Patent No.: US 12,647,755 B2
(45) Date of Patent: Jun. 2, 2026

(54) COOPERATIVE INFORMATION INTELLIGENCE PROTOCOLS AND SERVICES

(71) Applicant: QUALCOMM Incorporated, San Diego, CA (US)

(72) Inventors: Ramesh C.N. Rao, San Diego, CA (US); Sudeepto Roy, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 599 days.

(21) Appl. No.: 18/316,965

(22) Filed: May 12, 2023

(65) Prior Publication Data

US 2024/0381057 A1 Nov. 14, 2024

(51) Int. Cl.
*H04W 4/00* (2018.01)
*H04W 4/08* (2009.01)

(52) U.S. Cl.
CPC ..................................... *H04W 4/08* (2013.01)

(58) Field of Classification Search
CPC ......... H04W 4/08; H04W 4/023; H04W 4/70; H04W 4/80; H04W 4/38
See application file for complete search history.

(56) References Cited

U.S. PATENT DOCUMENTS

| | | | |
|---|---|---|---|
| 2023/0005366 A1 | 1/2023 | Yu et al. | |
| 2024/0080643 A1* | 3/2024 | Seed ..................... | G01S 5/0205 |
| 2024/0349033 A1* | 10/2024 | Holmes ................. | H04W 8/205 |

FOREIGN PATENT DOCUMENTS

| | | |
|---|---|---|
| WO | 2022147311 A1 | 7/2022 |

OTHER PUBLICATIONS

International Search Report and Written Opinion—PCT/US2024/016433—ISA/EPO—Jun. 14, 2024.

* cited by examiner

*Primary Examiner* — Omoniyi Obayanju
(74) *Attorney, Agent, or Firm* — QUALCOMM Incorporated

(57) ABSTRACT

In some implementations, a first wireless device may determine that a leader selection process has been initiated regarding data of a first type for a cluster of wireless devices comprising a plurality of wireless devices in range of wireless communication with one another, including the first wireless device. The first wireless device may, responsive to determining that the leader selection process has been initiated, acquire first data of the first type and may send the first data of the first type to one or more other wireless devices of the cluster. Sending the first data of the first type may be responsive to a determination that the first wireless device has not received any other data of the first type from the one or more other wireless devices of the cluster subsequent to determining that the leader selection process has been initiated.

30 Claims, 8 Drawing Sheets

FIG. 5

COOPERATIVE INFORMATION INTELLIGENCE PROTOCOLS AND SERVICES

BACKGROUND

1. Field of Disclosure

The present disclosure relates generally to the field of wireless communications, and more specifically to data sharing among groups of electronic devices capable of wireless communications.

2. Description of Related Art

Wireless mobile devices often may be grouped together for purposes of transit, shipping, or during in-field deployment or other use. Such mobile devices may periodically obtain one or more types of information, such as location, environmental/contextual data, and/or the like. This data may impact the operation of such mobile devices and/or may be communicated to a remote device to monitor the status of the mobile devices (e.g., while in transit, in use, etc.). Mobile devices may therefore send wireless transmissions reporting their estimated location and/or other information to a remote device (e.g., server). These wireless transmissions may be communicated via a wireless communication network, such as a cellular network.

BRIEF SUMMARY

An example method of cooperative data sharing among wireless devices, according to this disclosure, may comprise determining, at a first wireless device, whether a leader selection process has been initiated regarding data of a first type for a cluster of wireless devices, wherein a plurality of wireless devices in range of wireless communication with one another, and the cluster of wireless devices includes the first wireless device. The method also may comprise responsive to the determination, at a first wireless device, that the leader selection process has been initiated, acquiring first data of the first type at the first wireless device. The method also may comprise sending the first data of the first type from the first wireless device to one or more other wireless devices of the cluster, wherein sending the first data of the first type is responsive to a determination that the first wireless device has not received data of the first type from the one or more other wireless devices of the cluster subsequent to determining that the leader selection process has been initiated.

An example first wireless device for cooperative data sharing among wireless devices, according to this disclosure, may comprise at least one transceiver, at least one memory, one or more processors communicatively coupled with the transceiver and the memory, wherein the one or more processors are configured to determine whether a leader selection process has been initiated regarding data of a first type for a cluster of wireless devices, wherein: the cluster of wireless devices comprises a plurality of wireless devices in range of wireless communication with one another, and the cluster of wireless devices includes the first wireless device. The one or more processors further may be configured to responsive to the determination that the leader selection process has been initiated, acquire first data of the first type. The one or more processors further may be configured to send the first data of the first type via the transceiver to one or more other wireless devices of the cluster, wherein sending the first data of the first type is responsive to a determination that the first wireless device has not received data of the first type from the one or more other wireless devices of the cluster subsequent to determining that the leader selection process has been initiated.

An example apparatus for cooperative data sharing among wireless devices, according to this disclosure, may comprise means for determining whether a leader selection process has been initiated regarding data of a first type for a cluster of wireless devices, wherein: the cluster of wireless devices comprises a plurality of wireless devices in range of wireless communication with one another, and the cluster of wireless devices includes a first wireless device. The apparatus further may comprise means for acquiring first data of the first type, responsive to the determination that the leader selection process has been initiated. The apparatus further may comprise means for sending the first data of the first type from the first wireless device to one or more other wireless devices of the cluster, wherein sending the first data of the first type is responsive to a determination that the first wireless device has not received data of the first type from the one or more other wireless devices of the cluster subsequent to determining that the leader selection process has been initiated.

According to this disclosure, an example non-transitory computer-readable medium stores instructions for cooperative data sharing among wireless devices, the instructions comprising code for determining whether a leader selection process has been initiated regarding data of a first type for a cluster of wireless devices, wherein the cluster of wireless devices comprises a plurality of wireless devices in range of wireless communication with one another, and the cluster of wireless devices includes a first wireless device. The instructions further may comprise code for responsive to the determination that the leader selection process has been initiated, acquiring first data of the first type at the first wireless device. The instructions further may comprise code for sending the first data of the first type from the first wireless device to one or more other wireless devices of the cluster, wherein sending the first data of the first type is responsive to a determination that the first wireless device has not received data of the first type from the one or more other wireless devices of the cluster subsequent to determining that the leader selection process has been initiated. This summary is neither intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim. The foregoing, together with other features and examples, will be described in more detail below in the following specification, claims, and accompanying drawings.

BRIEF DESCRIPTION OF THE DRAWINGS

FIG. 5 is a diagram of an example system that shows how leader devices may be assigned differently for homogenous and heterogeneous clusters.

Figure 1:
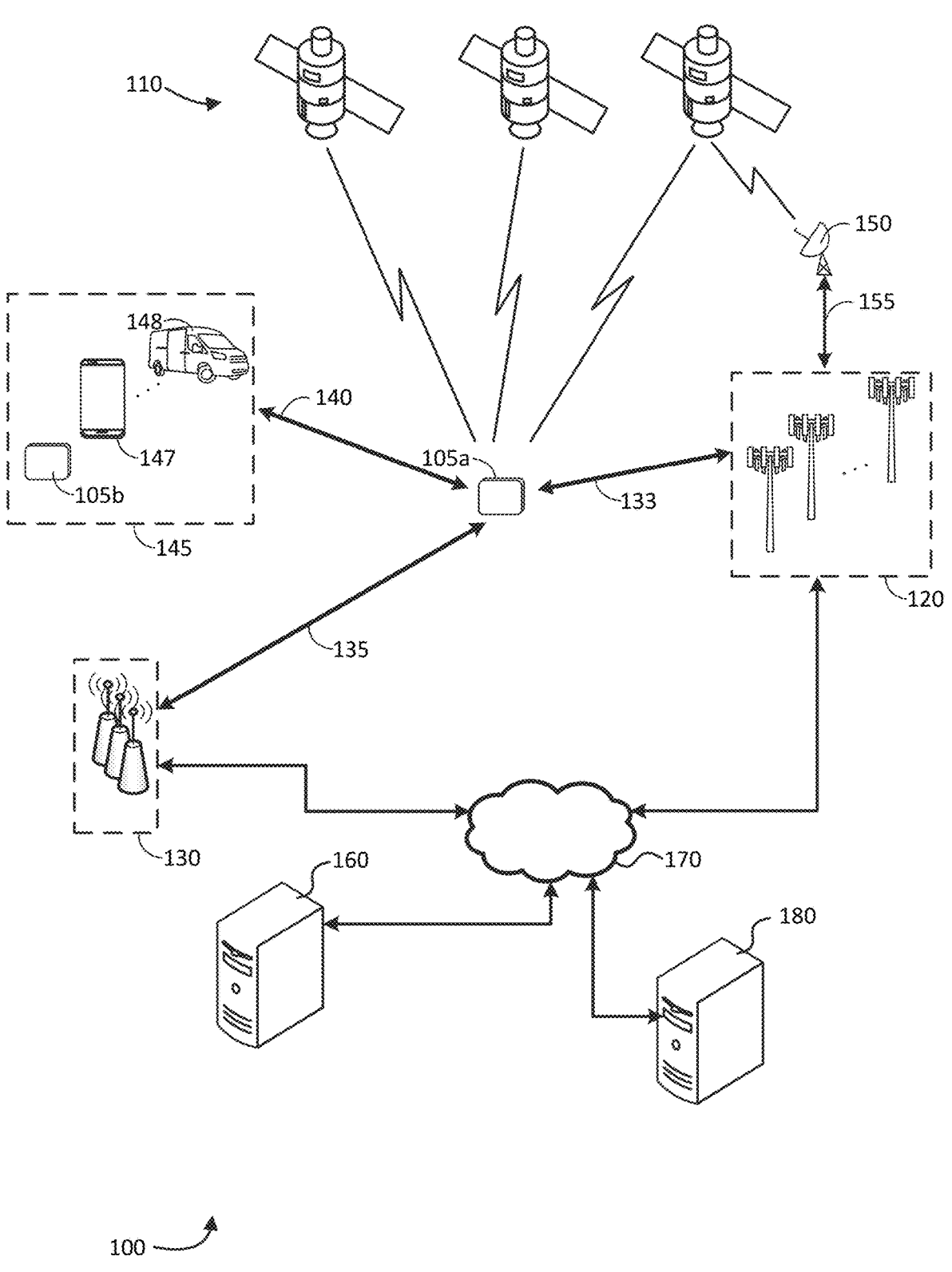
FIG. 1 is a simplified illustration of a wireless system capable of implementing techniques and protocols disclosed herein to limit the number of devices in a cluster that obtain and communicate data, according to an embodiment.

Like reference symbols in the various drawings indicate like elements, in accordance with certain example implementations. In addition, multiple instances of an element may be indicated by following a first number for the element with a letter or a hyphen and a second number. For example, multiple instances of an element 110 may be indicated as 110-1, 110-2, 110-3, etc., or as 110a, 110b, 110c, etc. When referring to such an element using only the first number, any instance of the element is to be understood (e.g., element 110 in the previous example would refer to elements 110-1, 110-2, and 110-3 or to elements 110a, 110b, and 110c).

DETAILED DESCRIPTION

The following description is directed to certain implementations for the purposes of describing innovative aspects of various embodiments. However, a person having ordinary skill in the art will readily recognize that the teachings herein can be applied in a multitude of different ways. The described implementations may be implemented in any device, system, or network that is capable of transmitting and receiving radio frequency (RF) signals according to any communication standard, such as any of the Institute of Electrical and Electronics Engineers (IEEE) 802.15.4 standards for ultra-wideband (UWB), IEEE 802.11 standards (including those identified as Wi-Fi® technologies), the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Rate Packet Data (HRPD), High Speed Packet Access (HSPA), High Speed Downlink Packet Access (HSDPA), High Speed Uplink Packet Access (HSUPA), Evolved High Speed Packet Access (HSPA+), Long Term Evolution (LTE), Advanced Mobile Phone System (AMPS), or other known signals that are used to communicate within a wireless, cellular or internet of things (IoT) network, such as a system utilizing 3G, 4G, 5G, 6G, or further implementations thereof, technology.

As used herein, an "RF signal" comprises an electromagnetic wave that transports information through the space between a transmitter (or transmitting device) and a receiver (or receiving device). As used herein, a transmitter may transmit a single "RF signal" or multiple "RF signals" to a receiver. However, the receiver may receive multiple "RF signals" corresponding to each transmitted RF signal due to the propagation characteristics of RF signals through multiple channels or paths.

Additionally, unless otherwise specified, references to "reference signals," "positioning reference signals," "reference signals for positioning," and the like may be used to refer to signals used for positioning of a user equipment (UE) in a 5G new radio (NR) network. As described in more detail herein, such signals may comprise any of a variety of signal types but may not necessarily be limited to a Positioning Reference Signal (PRS) as defined in relevant wireless standards.

Further, unless otherwise specified, the term "positioning" as used herein may include absolute location determination, relative location determination, ranging, or a combination thereof. Such positioning may include and/or be based on timing, angular, phase, or power measurements, or a combination thereof (which may include RF sensing measurements) for the purpose of location or sensing services.

As previously noted, wireless mobile devices can determine and communicate data to a remote device, such as a server. These mobile devices may include any of a variety of device types, such as mobile phones, wearable devices, augmented reality (AR)/virtual reality (VR) devices, etc.). Additionally or alternatively, these mobile devices may comprise wireless electronic tags (e.g., affixed to an item) used to monitor the status of an item (e.g., a package, palette, or shipping container) during shipping, product delivery, in a retail or commercial environment, etc. The status may include data such as location, temperature, humidity, movement (e.g., vibrations), light, sound, etc., or any combination thereof.

With the large-scale proliferation of "connected" devices that are being installed in various settings (e.g., enterprise settings, private networks, automotive, smart factory use cases, healthcare, construction, smart cities, asset tracking services, airports, bus and train stations, railway yards, shipping ports, docking yards, regional-hub warehouses, sports and entertainment venues, etc.), a high-accuracy location of these devices at all times is often desirable (e.g., to managing entity), while taking advantage of the best conditions to obtain location information and using the least amount of power to sustain the device performance of all devices in a monitored group of devices, or "cluster." In addition to the location, there is value in knowing the relative condition or "environment" of individual cluster members (such as temperature, humidity, air quality, chemical presence/absence, electric and magnetic field (EMF) radiation, vibration, etc.). However, having each device individually report location and/or other relevant data to a server to enable location and environmental condition tracking can be expensive in terms of power consumption, network congestion, and/or other resources. Further, device operating conditions (e.g., temperature, location, satellite visibility, antenna capabilities, the relative position of devices, etc.) may lead to varying degrees of position and/or other data accuracy in a cluster or an installation. These relative locations or conditions can help with generating environmental condition maps, such as thermal gradient, humidity gradient, relative scattering, etc. within the cluster.

To address these and other issues, various aspects of the embodiments described herein relate generally to providing techniques and protocols to limit the number of devices in a cluster that obtain and communicate data. Some aspects more specifically relate to designating a leader of a cluster to obtain data and communicate the data with other devices in the cluster. In some examples, the leader is designated on a per-data-type basis, where one device may be designated as a lead device for obtaining positioning information, another device may be designated as a lead device for obtaining temperature information, and so forth. Moreover, devices may be grouped differently, depending on the data type, device type, and/or other factors.

Particular aspects of the subject matter described in this disclosure can be implemented to realize one or more of the following potential advantages. In some examples, by designating a lead device to obtain and share data among a cluster, the described techniques can be used to enable the cluster to operate more efficiently, resulting in extended battery life of devices in the cluster and more efficient wireless resource usage. These and other advantages will be apparent to a person of ordinary skill in the art in view of this disclosure. Embodiments will be described in detail hereafter, after a review of relevant technologies.

FIG. 1 is a simplified illustration of a wireless system capable of communication and positioning, referred to herein simply as a positioning system 100 in which a mobile device 105a, network function server 160, and/or other components of the positioning system 100 can use the techniques provided herein for implementing techniques and protocols to limit the number of devices in a cluster that obtain and communicate data, according to an embodiment. (That said, embodiments are not necessarily limited to such a system.) The techniques described herein may be implemented by one or more components of the positioning system 100. The positioning system 100 can include: a mobile device 105a; one or more satellites 110 (also referred to as space vehicles (SVs)), which may include Global Navigation Satellite System (GNSS) satellites (e.g., satellites of the Global Positioning System (GPS), GLONASS, Galileo, Beidou, etc.) and or Non-Terrestrial Network (NTN) satellites; base stations 120; access points (APs) 130; network function server 160; network 170; and external client 180. In FIG. 1, another mobile device 105b of the same device type as mobile device 105a is illustrated. Techniques for locating the position of mobile device 105a may also apply to mobile device 105b. Mobile devices 105a and 105b may be referred to herein collectively and/or generically as mobile device 105.

In the positioning system 100, mobile device(s) 105 may comprise wireless mobile (e.g., movable) devices capable of determining its position in communicating via one or more wireless networks. Although illustrated as a positioning tag in FIG. 1, a mobile device 105 may include other types of devices. This may include, for example, a mobile phone, laptop, tablet, personal data assistant (PDA), navigation device, Internet of Things (IoT) device, wearable device, In-Vehicle communications System (IVS) or other vehicle system/device, or some other portable or moveable device with wireless communication capabilities Generally put, the positioning system 100 may be capable of enabling communication between the mobile device 105 and other devices, and positioning of the mobile device 105 and/or other devices by the mobile device 105 and/or other devices, or a combination thereof. For example, the positioning system 100 can estimate a location of the mobile device 105 based on RF signals received by and/or sent from the mobile device 105 and known locations of other components (e.g., GNSS satellites 110, base stations 120, APs 130) transmitting and/or receiving the RF signals. Additionally or alternatively, wireless devices such as the mobile device 105, base stations 120, and satellites 110 (and/or other NTN platforms, which may be implemented on airplanes, drones, balloons, etc.) can be utilized to perform positioning (e.g., of one or more wireless devices) and/or perform RF sensing (e.g., of one or more objects by using RF signals transmitted by one or more wireless devices).

It should be noted that FIG. 1 provides only a generalized illustration of various components, any or all of which may be utilized as appropriate, and each of which may be duplicated as necessary. Specifically, although only one mobile device 105 is illustrated, it will be understood that many UEs (e.g., hundreds, thousands, millions, etc.) may utilize the positioning system 100. Similarly, the positioning system 100 may include a larger or smaller number of base stations 120 and/or APs 130 than illustrated in FIG. 1. The illustrated connections that connect the various components in the positioning system 100 comprise data and signaling connections which may include additional (intermediary) components, direct or indirect physical and/or wireless connections, and/or additional networks. Furthermore, components may be rearranged, combined, separated, substituted, and/or omitted, depending on desired functionality. In some embodiments, for example, the external client 180 may be directly connected to network function server 160. A person of ordinary skill in the art will recognize many modifications to the components illustrated.

Depending on desired functionality, the network 170 may comprise any of a variety of wireless and/or wireline networks. The network 170 can, for example, comprise any combination of public and/or private networks, local and/or wide-area networks, and the like. Furthermore, the network 170 may utilize one or more wired and/or wireless communication technologies. In some embodiments, the network 170 may comprise a cellular or other mobile network, a wireless local area network (WLAN), a wireless wide-area network (WWAN), and/or the Internet, for example. Examples of network 170 include a Long-Term Evolution (LTE) wireless network, a Fifth Generation (5G) wireless network (also referred to as New Radio (NR) wireless network or 5G NR wireless network), a Wi-Fi WLAN, and the Internet, LTE, 5G and NR are wireless technologies defined, or being defined, by the 3rd Generation Partnership Project (3GPP). In and LTE, 5G, or other cellular network, mobile device 105 may be referred to as a user equipment (UE). Network 170 may also include more than one network and/or more than one type of network.

The base stations 120 and access points (APs) 130 may be communicatively coupled to the network 170. In some embodiments, the base station 120s may be owned, maintained, and/or operated by a cellular network provider, and may employ any of a variety of wireless technologies, as described herein below. Depending on the technology of the network 170, a base station 120 may comprise a node B, an Evolved Node B (eNodeB or eNB), a base transceiver station (BTS), a radio base station (RBS), an NR NodeB (gNB), a Next Generation eNB (ng-eNB), or the like. A base station 120 that is a gNB or ng-eNB may be part of a Next Generation Radio Access Network (NG-RAN) which may connect to a 5G Core Network (5GC) in the case that Network 170 is a 5G network. The functionality performed by a base station 120 in earlier-generation networks (e.g., 3G and 4G) may be separated into different functional components (e.g., radio units (RUS), distributed units (DUs), and central units (CUs)) and layers (e.g., L1/L2/L3) in view Open Radio Access Networks (O-RAN) and/or Virtualized Radio Access Network (V-RAN or vRAN) in 5G or later networks, which may be executed on different devices at different locations connected, for example, via fronthaul, midhaul, and backhaul connections. As referred to herein, a "base station" (or ng-eNB, gNB, etc.) may include any or all of these functional components. An AP 130 may comprise a Wi-Fi AP or a Bluetooth® AP or an AP having cellular capabilities (e.g., 4G LTE and/or 5G NR), for example. Thus, mobile device 105 can send and receive information with network-connected devices, such as network function server 160, by accessing the network 170 via a base station 120 using a first communication link 133. Additionally or alternatively, because APs 130 also may be communicatively coupled with the network 170, mobile device 105 may communicate with network-connected and Internet-connected devices, including network function server 160, using a second communication link 135, or via one or more other devices 145.

As used herein, the term "base station" may generically refer to a single physical transmission point, or multiple co-located physical transmission points, which may be located at a base station 120. A Transmission Reception Point (TRP) (also known as transmit/receive point) corresponds to this type of transmission point, and the term "TRP" may be used interchangeably herein with the terms "gNB," "ng-eNB," and "base station." In some cases, a base station 120 may comprise multiple TRPs—e.g. with each TRP associated with a different antenna or a different antenna array for the base station 120. As used herein, the transmission functionality of a TRP may be performed with a transmission point (TP) and/or the reception functionality of a TRP may be performed by a reception point (RP), which may be physically separate or distinct from a TP. That said, a TRP may comprise both a TP and an RP. Physical transmission points may comprise an array of antennas of a base station 120 (e.g., as in a Multiple Input-Multiple Output (MIMO) system and/or where the base station employs beamforming). According to aspects of applicable 5G cellular standards, a base station 120 (e.g., gNB) may be capable of transmitting different "beams" in different directions, and performing "beam sweeping" in which a signal is transmitted in different beams, along different directions (e.g., one after the other). The term "base station" may additionally refer to multiple non-co-located physical transmission points, the physical transmission points may be a Distributed Antenna System (DAS) (a network of spatially separated antennas connected to a common source via a transport medium) or a Remote Radio Head (RRH) (a remote base station connected to a serving base station).

Satellites 110 may be utilized for positioning in communication in one or more way. For example, satellites 110 (also referred to as space vehicles (SVs)) may be part of a Global Navigation Satellite System (GNSS) such as the Global Positioning System (GPS), GLONASS, Galileo or Beidou. Positioning using RF signals from GNSS satellites may comprise measuring multiple GNSS signals at a GNSS receiver of the mobile device 105 to perform code-based and/or carrier-based positioning, which can be highly accurate. Additionally or alternatively, satellites 110 may be utilized as communication satellites for a Non-Terrestrial Network (NTN), e.g. where mobile device 105 accesses network 170 via a satellite 110 which in turn accesses the base station 120. This link between satellite 110 and base station 120 may be enabled via NTN gateways 150 (also known as "gateways," "earth stations," or "ground stations"), which can send and receive wireless signals from the satellite 110, and further communicate with the base station 110 via a wireless and/or wired communication link 155. In some embodiments, NTN gateways 150 may function as DUs of a base station 120, as described previously. Satellites 110 may then support NTN-based positioning and may functionally operate as TRPs (or TPs) of a network (e.g., LTE and/or NR network). In particular, reference signals such as positioning reference signals (PRS) that are transmitted by satellites 110 to support NTN-based positioning may be similar to reference signals transmitted by base stations 120 and may be coordinated by a network function server 160, which may operate as a location server. In some embodiments, satellites 110 used for NTN-based positioning may be different than those used for GNSS-based positioning. In some embodiments NTN nodes may include non-terrestrial vehicles such as airplanes, balloons, drones, etc., which may be in addition or as an alternative to NTN satellites.

The network function server 160 may comprise one or more servers and/or other computing devices configured to provide a network-managed and/or network-assisted function, such as operating as a location server and/or sensing server. A location server, for example, may determine an estimated location of mobile device 105 and/or provide data (e.g., "assistance data") to mobile device 105 to facilitate location measurement and/or location determination by mobile device 105. According to some embodiments, a location server may comprise a Home Secure User Plane Location (SUPL) Location Platform (H-SLP), which may support the SUPL user plane (UP) location solution defined by the Open Mobile Alliance (OMA) and may support location services for mobile device 105 based on subscription information for mobile device 105 stored in the location server. In some embodiments, the location server may comprise, a Discovered SLP (D-SLP) or an Emergency SLP (E-SLP). The location server may also comprise an Enhanced Serving Mobile Location Center (E-SMLC) that supports location of mobile device 105 using a control plane (CP) location solution for LTE radio access by mobile device 105. The location server may further comprise a Location Management Function (LMF) that supports location of mobile device 105 using a control plane (CP) location solution for NR or LTE radio access by mobile device 105.

Although terrestrial components such as APs 130 and base stations 120 may be fixed, embodiments are not so limited. Mobile components may be used. For example, in some embodiments, a location of the mobile device 105 may be estimated at least in part based on measurements of RF signals 140 communicated between the mobile device 105 and one or more other devices 145, which may be mobile or fixed. As illustrated, other mobile devices may include, for example, another mobile device 105*b* of the same device type, a cellular device 147 (e.g., smart phone, tablet, laptop, etc.), a vehicle 148 (e.g., shipping/transit vehicle, such as a cargo ship, semi-trailer truck, delivery van, etc.), or a combination thereof. Wireless signals from devices 145 (which may include RF signals 140 used for communication) may be used for positioning of the mobile device 105 and may comprise RF signals using, for example, Bluetooth® (including Bluetooth Low Energy (BLE)), IEEE 802.11x (e.g., Wi-Fi®), Ultra-Wideband (UWB), IEEE 802.15x, sidelink (e.g., as defined in LTE and NR by the standards), or a combination thereof. Devices 145 may additionally or alternatively use non-RF wireless signals for positioning of the mobile device 105, such as infrared signals or other optical technologies.

An estimated location of mobile device 105 can be used in a variety of applications—e.g., to assist direction finding or navigation for a user of mobile device 105 or to assist another user (e.g., associated with external client 180) to locate mobile device 105. A "location" is also referred to herein as a "location estimate", "estimated location", "location", "position", "position estimate", "position fix", "estimated position", "location fix" or "fix". The process of determining a location may be referred to as "positioning," "position determination," "location determination," or the like. A location of mobile device 105 may comprise an absolute location of mobile device 105 (e.g. a latitude and longitude and possibly altitude) or a relative location of mobile device 105 (e.g. a location expressed as distances north or south, east or west and possibly above or below some other known fixed location (including, e.g., the location of a base station 120 or AP 130) or some other location such as a location for mobile device 105 at some known previous time, or a location of a device 145 (e.g., another UE) at some known previous time). A location may be specified as a geodetic location comprising coordinates which may be absolute (e.g., latitude, longitude and optionally altitude), relative (e.g., relative to some known absolute location) or local (e.g., X, Y and optionally Z coordinates according to a coordinate system defined relative to a local area such a factory, warehouse, college campus, shopping mall, sports stadium or convention center). A location may instead be a civic location and may then comprise one or more of a street address (e.g., including names or labels for a country, state, county, city, road and/or street, and/or a road or street number), and/or a label or name for a place, building, portion of a building, floor of a building, and/or room inside a building etc. A location may further include an uncertainty or error indication, such as a horizontal and possibly vertical distance by which the location is expected to be in error or an indication of an area or volume (e.g., a circle or ellipse) within which mobile device 105 is expected to be located with some level of confidence (e.g., 95% confidence).

The external client 180 may be a web server or remote application that may have some association with mobile device 105. In some embodiments, for example, the external client 180 may comprise a monitoring server configured to monitor the location of devices including the mobile device 105. Additionally or alternatively, the external client 180 may obtain and provide the location of mobile device 105 to an emergency services provider, government agency, etc.

A particular mobile device may be part of a larger group or cluster of mobile devices, each of which may provide information to a remote device (e.g., location server 160 and/or external client 180 of FIG. 1). As previously noted, using all individual devices to obtain and report data (e.g., location and/or environmental data) can be costly in terms of resources such as battery power, network ingestion, etc.

Figure 2A:
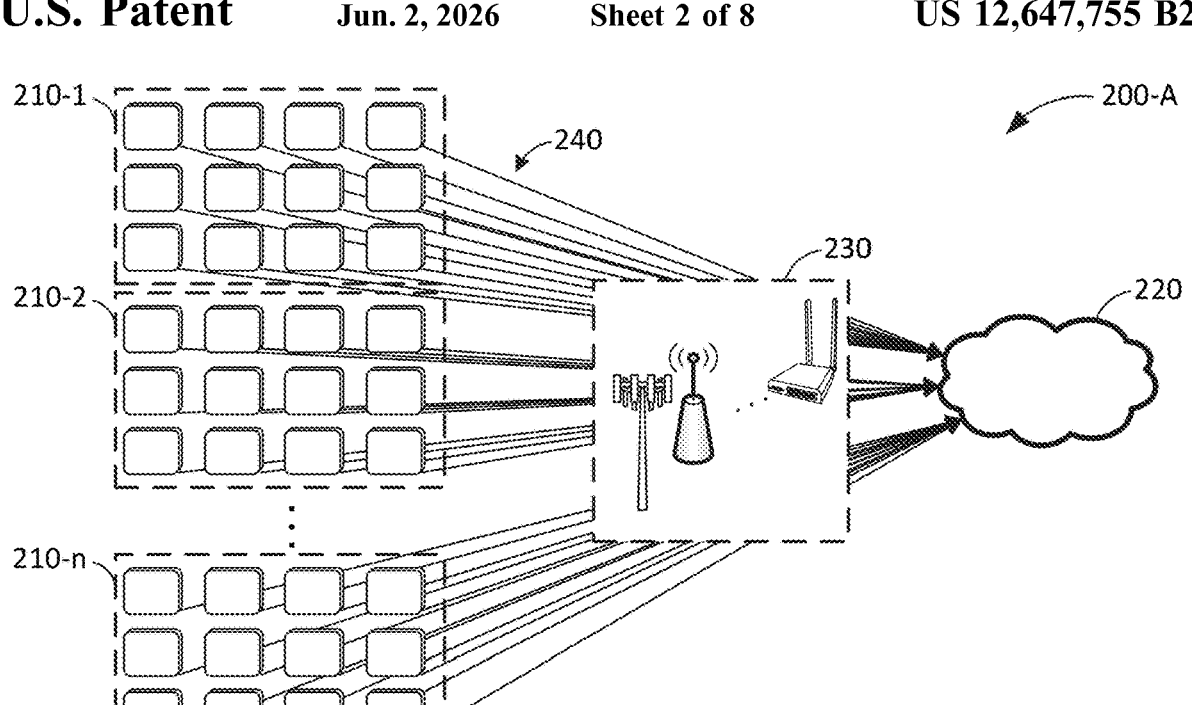
FIG. 2A is a diagram offered to help illustrate how using all individual devices to report data can because network congestion.

FIG. 2A is a diagram 200-A offered to help illustrate how using all individual devices to report data can because network congestion. Here, there are n clusters 210 (210-1, 210-2, . . . , 210-_n_), each containing a number of devices. It can be noted that, although clusters 210 illustrated in FIG. 2A each has the same number of devices, embodiments are not so limited. Different clusters 210 may have different numbers of devices, for example, and further may have different device types. Clusters 210 may represent groups of devices, such as those deployed in IoT use cases for smart factories, enterprise-wide installations, installations a cover a geographically defined area, etc. Additionally or alternatively, clusters 210 may represent groups of products in a shipping container, truck, etc., where each device may be associated with a different product or box/crate of products, for example. Clusters 210 may comprise ad-hoc clusters comprising groups of products made/sold/installed/branded by an original equipment manufacturer (OEM), original design manufacturer (ODM), carrier, and/or system integrator, which may be installed at a single location or a multiplicity of locations, communicating through a commonly agreed upon protocol that allows for location and condition sharing for the temporary duration of the association within a cluster. An example of such "ad-hoc clusters" is a truck picking up an assortment of unrelated goods from a shipping yard for transport to a warehouse, or a "smart pallet" used to transport different products within a warehouse at different times of the workday, or a smart bulk container used for, for example, vegetables one day and smartphones on another day.

Figure 2B:
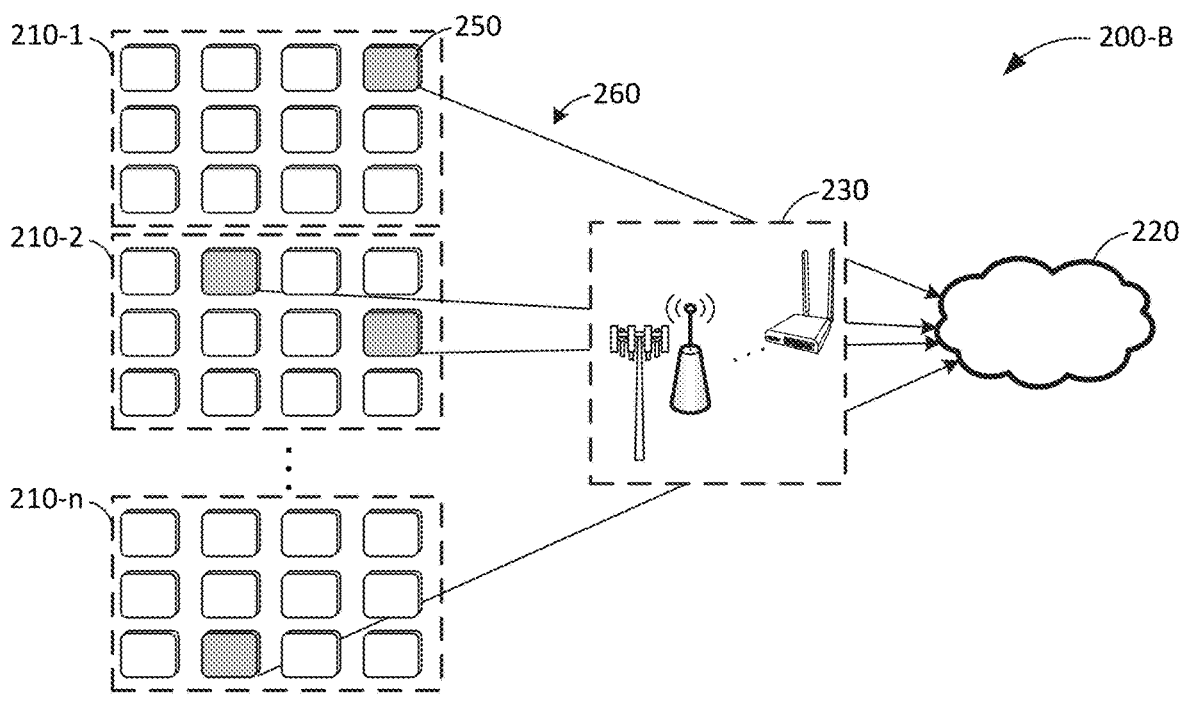
FIG. 2B is a diagram illustrating how clusters of devices can communicate with the cloud via leader devices, according to some embodiments.

In the example of FIG. 2A, which is illustrative of traditional reporting techniques, each device of each group 210 individually reports to a cloud 220 (e.g., server, network, etc.) using network access devices 230. Here, network access devices 230 may comprise one or more devices that grant devices of groups 210 access to the network 220. This may include, for example, base stations (e.g., base stations 120 of FIG. 1), access points (e.g., APs 130 of FIG. 1), mobile edge devices, other gateway-type devices, or any combination thereof. As such, there are a large number of communication links (represented by arrows 240) that need to be separately established and maintained. As such, traditional techniques in which each device obtains and reports data may require a relatively large amount of communication resources. As noted, embodiments herein can help reduce the amount of communication resources used and provide other efficiencies/advantages by providing a set of protocols/service capabilities that are designed for clusters. FIG. 2B illustrates an example.

FIG. 2B is a diagram 200-B, similar to the diagram 200-A of FIG. 2A. Here, however, clusters 210 communicate with the cloud 220 via leader devices 250 (in gray; to avoid clutter, only one leader device is labeled). In short, a leader device 250 of a cluster 210 may obtain and report data on behalf of its cluster 210. As such, there are far fewer communication links (represented by arrows 260), which enables more efficient usage of network resources, allows battery savings by the cluster 210 as a whole, and eliminates redundancy of shared data. Applications may include essentially any system in which clusters may be formed this can include, for example, Internet of things (IoT) use cases such as smart city, smart factory, and/or enterprise installations; mobile edge cloud (MEC) applications; vehicle to everything (V2X) applications were vehicles (e.g., AGVs, vehicle fleets, drones, etc.) share information among a group; augmented reality (AR)/virtual reality (VR) applications; wearable devices; or the like; or any combination thereof.

As described in more detail below, each cluster 210 may select a leader device 250, which may remain as leader for a certain amount of time and/or until a condition to relinquish leadership is met. The device leader 250 may obtain data of one or more data types (e.g., position, temperature, movement, humidity, sound, light, chemical levels, etc.), and not only may report the obtained data the cloud 220 but may also share the obtained data with devices in the cluster 210. In some embodiments, different device leaders 250 may be selected for different data types (e.g., as indicated in cluster 210-2 of FIG. 2B, which has two leaders 250). The role of device leader 250 also may be rotated over time, such that different devices in a cluster 210 may serve as a device leader for a period of time and/or up until an additional or alternative condition to relinquish leadership has been met, at which point another leader device 250 may be selected. Additional details regarding leader selection are provided below, with respect to FIG. 4.

As a matter of terminology, a leader device for a cluster may be referred to generically as a leader device. Additionally or alternatively, a leader device for positioning for the cluster may be called a "lead position identifier" (LPI), a leader device for temperature may be called a "lead to temperature identifier" (LTI), and so forth. Generically, a leader device may be called an "LXI," where the "χ" may refer to one or more cluster-related data types obtained and/or shared by the LXI.

The type of data shared among devices in a cluster may vary, depending on desired functionality. Clusters used in different applications may collect and share data of different types. For example, medical applications may utilize one or more sensors that include and/or sense temperature, vibration, pressure, fluid property, light/optical, audio, optical, electrocardiogram (ECG), glucose, or any combination thereof. Mobility/positioning applications may utilize one or more sensors that include and/or sense acceleration, pressure, altitude, gyroscope, audio, load/weights, orientation, motion, location, inclinometer, or any combination thereof. Environmental applications may utilize one or more sensors that include and/or sense proximity, sound/voice, vibration, light, camera, optical, smoke, air quality, chemical, magnetic field, or any combination thereof. Gaming/sports/fitness applications may utilize one or more sensors that include and/or sense an IMU, orientation (absolute & relative), gravity, inclinometer, or any combination thereof. It can be noted that some generic sensors may be used to sense specific things. For example, an accelerometer or IMU may be used to sense gravity, a sound sensor (or mic) may be used (e.g., in conjunction with a microprocessor) to sense a voice, a pressure sensor may be used to sense a weight or load, etc.

Figure 3A:
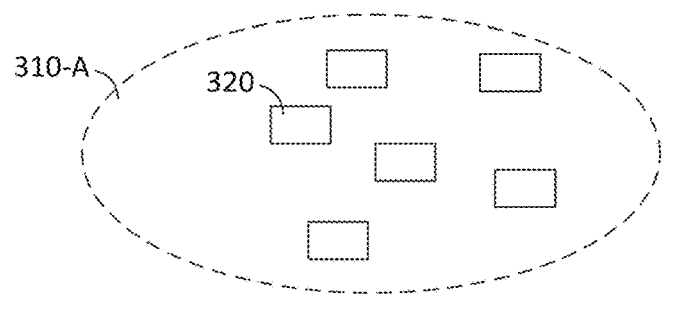
FIGS. 3A-3C are diagrams that illustrate different types of clusters that may utilize the embodiments herein for data sharing among devices in a cluster.
Figure 3B:
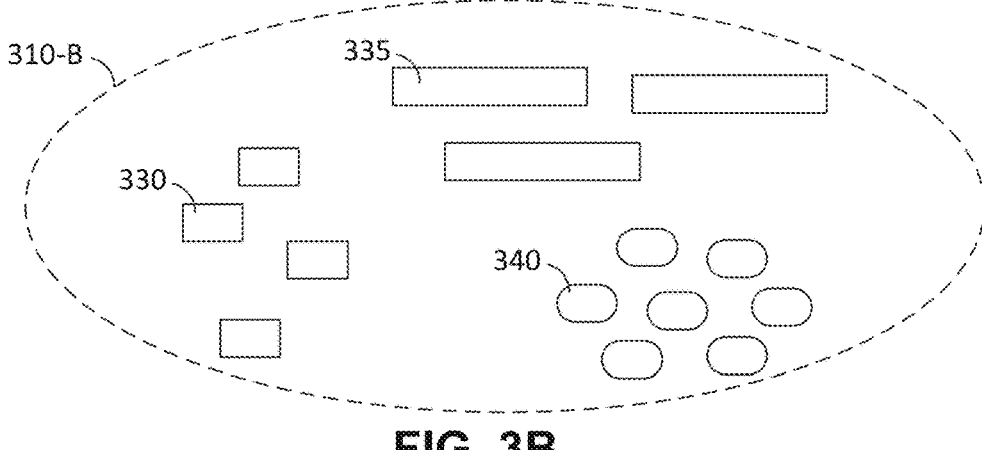
Figure 3C:
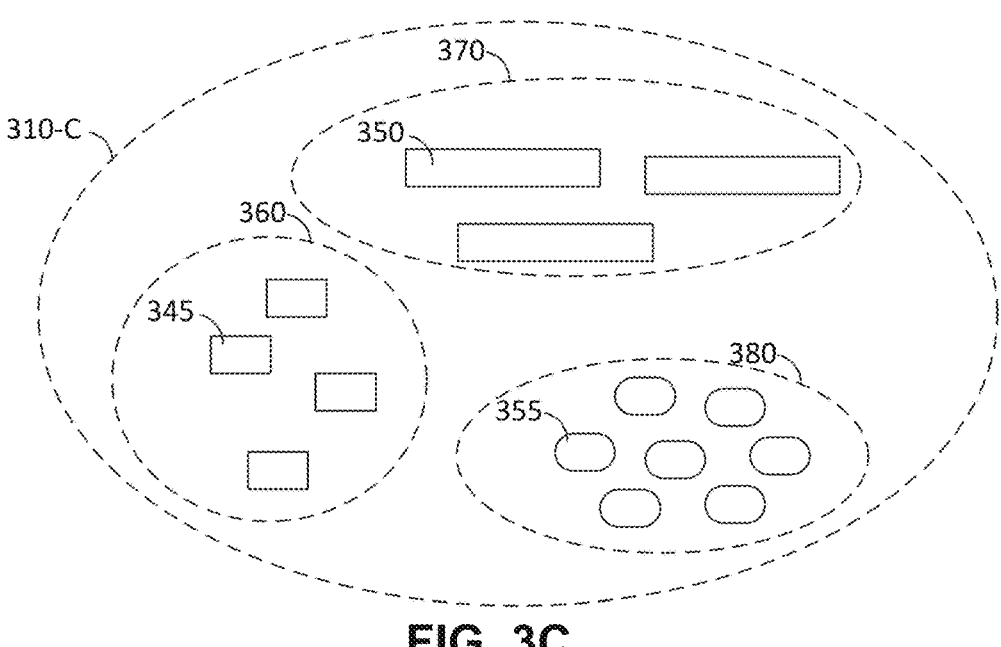

FIGS. 3A-3C are diagrams that illustrate different types of clusters that may utilize the embodiments herein for data sharing among devices in a cluster. Different device types are represented by different shapes. As with other figures, FIGS. 3A-3C are provided as non-limiting examples. Embodiments may have any number of devices, device types, sub-clusters, and/or other features. As noted elsewhere herein, devices may be grouped based on the type of wireless device performing communication (e.g., smartphone, wearable device, tag, etc.) and/or may be based on the type of item (e.g., product and/or group/box/crate of products) with which the wireless device is associated. As such, the "devices" and "device types" referred to in the embodiments of FIGS. 3A-3C, and elsewhere herein, may respectively refer to the wireless devices and wireless device types performing the communication and/or respectively refer to the items and item types with which the wireless devices are associated. As an example, wireless devices may be associated with fruit and smartphones being shipped in the same truck. The wireless devices themselves may comprise smart shipping tags that are similar or the same. However, the wireless devices associated with the fruit may form one cluster, while the wireless devices associated with the smartphones reform another. Clusters may be established on a semi-permanent or ad-hoc basis and may comprise a temporary of trusted devices. Devices may be identified using common identifiers for association such as Mac ID, electronic serial number (ESN), keys provisioned on the hardware units, manufacturer id, system integrator authentication mechanisms, or any combination thereof. As described in more detail hereafter, FIGS. 3A-3C illustrate different types of device clusters, where FIG. 3A illustrates a homogenous cluster, FIG. 3B illustrates a heterogeneous cluster, and FIG. 3C comprises a "super cluster" having a plurality of homogeneous and/or heterogeneous sub-clusters.

FIG. 3A is a diagram of a first cluster 310-A, comprising devices 320 of a single device type. The first cluster 310-A represents a homogenous cluster, in which all devices may be made by the same OEM and may be of similar design and functionality. An example of a homogenous cluster may comprise multiple tags (or trackers) used in a pallet, a deployment of thermal sensors in a factory, a fleet of vehicles or automated guided vehicles (AGVs), a swarm of drones, etc.

FIG. 3B is a diagram of a second cluster 310-B, comprising devices 330 of a first device type, devices 335 of a second device type, and devices 340 of a third device type. The second cluster 310-B therefore represents a heterogeneous cluster, which includes devices of multiple types. A heterogeneous cluster may be made by forming a cluster of devices of different device types with different (e.g., complementary) functionality. Different device types may be made by different manufacturers or the same manufacturer. A single manufacturer of a smartphone, earbuds, and smartwatch, for example, may cause these different device types to form a single heterogeneous cluster, for example. Another example of a heterogeneous cluster may comprise an AGV, a smart camera-equipped drone, a shipping tag, and/or other devices, all of which are deployed in a smart factory.

FIG. 3C is a diagram of a third cluster 310-C, comprising devices 345 of a first device type, devices 350 of a second device type, and devices 355 of a third device type. As opposed to the second cluster 310-B of FIG. 3B, the third cluster 310-C groups devices of different device types into different sub-clusters 360, 370, and 380. The third cluster 310-C may comprise a manually defined cluster, which may be defined based on a business plan/objective or an operational definition. In some instances, a manually defined cluster may comprise a homogenous cluster or heterogeneous cluster with one or more sub-clusters, where each sub-cluster may be classified as homogenous or heterogeneous, as described above. This setup may be used in applications such as a smart factory, an enterprise deployment, or a smart city.

The formation of clusters, each device type may have its own particular needs with respect to obtaining and reporting data. That is, each device may support a variety of environmental, contextual, and location/position tracking types of functionality, and different devices may need different data types, different quality levels of data, etc. to operate, and/or may have different reporting requirements. For example, tracking tags used in shipping fruit may report location, temperature, moisture, and/or other data, whereas tracking tags used in shipping high-end electronics may only need to report location and movement (e.g., IMU readings/shock forces). Reporting frequency, data accuracy, and/or other aspects of the data may also vary between device types. As such, device clusters may be formed to group devices by similar data obtaining/reporting requirements, enabling a single device (leader device) to be used to obtain data (of one or more data types), share the data with other devices in the group, and report the data on behalf of the group.

Figure 4:
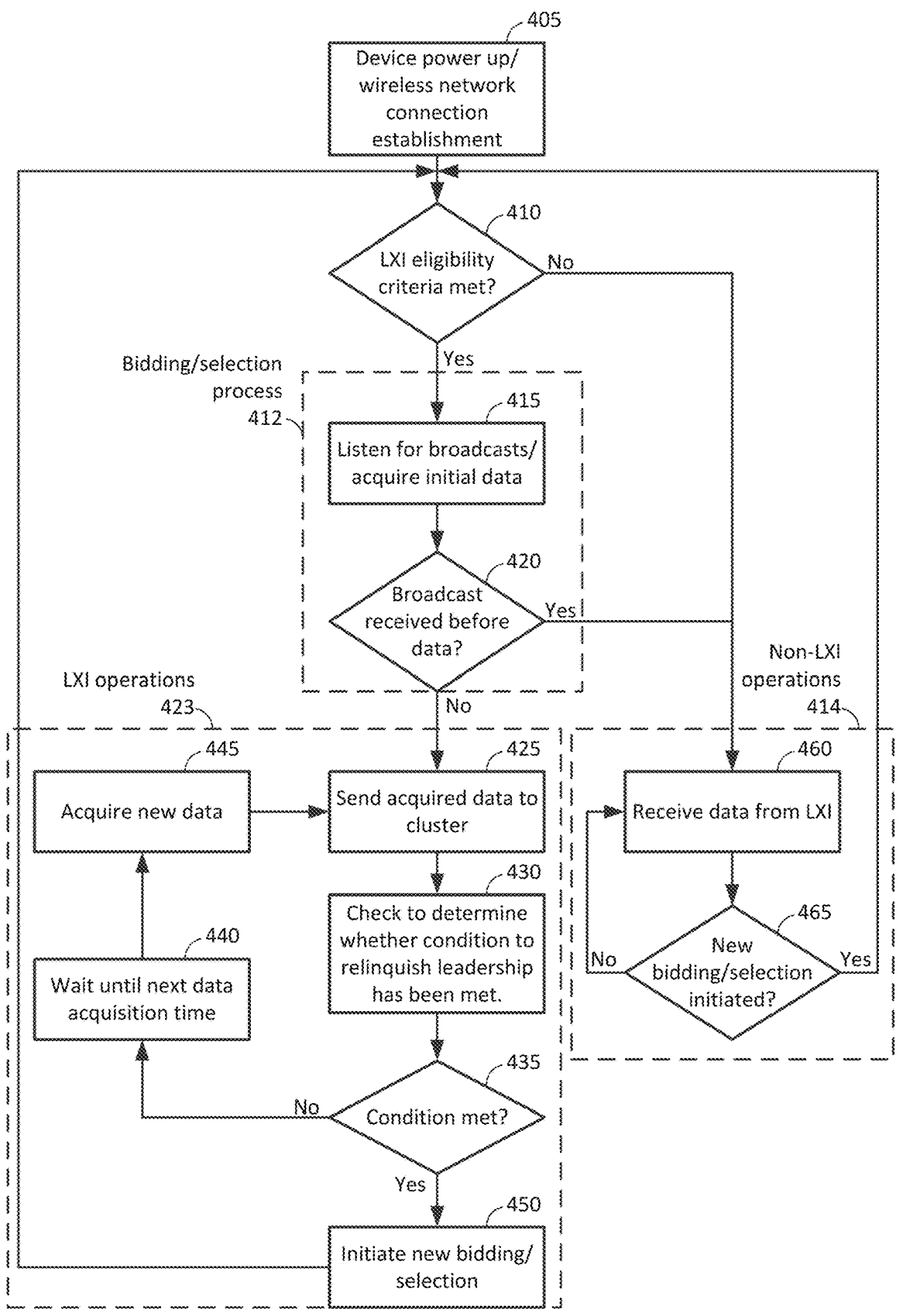
FIG. 4 is a flowchart illustrating a process by which devices in a cluster may perform leader selection in a cluster, according to some embodiments.

FIG. 4 is a flowchart illustrating a process by which devices in a cluster may perform leader selection in a cluster, according to some embodiments. The operations in the blocks of FIG. 4 may be performed by each device in a cluster, and, by doing so, may perform leader selection for the cluster. As noted elsewhere, different leader devices may be selected for different data types. As such, the process illustrated in the flowchart of FIG. 4 may be separately executed for each data type, according to some embodiments. The processes may be performed, for example, by processors 710 of mobile device 700 in FIG. 7, described in more detail hereafter. Additionally or alternatively, some or all operations in the blocks of FIG. 4 may be performed in the cloud (e.g., one or more servers communicatively coupled with the devices in a cluster), based on information provided by the devices in the cluster. An indication of the result of the operation(s) performed in the cloud can be provided in the devices in the cluster (e.g., indicating a new leader, a new bidding/selection process, etc.).

The process may begin with the functionality shown at block 405, in which the device powers up and establishes a wireless network connection. Depending on the type of wireless device, the wireless connection may comprise a cellular, Wi-Fi, and/or other wireless connection. Device power-up may further comprise executing various power-up routines, sensor calibration, executing self-diagnostics, etc. Different device types may have different power-up routines. According to some embodiments, devices may further include establishing a connection with a remote device (e.g., server) and optionally providing status information to the remote device as part of powering up and establishing a network connection.

At block 410, a determination is made whether the device meets LXI eligibility criteria. That is, prior to entering a bidding/selection process 412 in which a device may possibly become the LXI of a cluster to which the device belongs, the device may first determine whether it meets certain eligibility criteria. This determination may comprise determining whether certain thresholds are met, such as battery capacity and/or charge level (e.g., highest charge level and/or highest remaining battery capacity, least power drain, etc.), connectivity requirements (e.g., network connection establishment, a minimum quality of service (QOS) (e.g., minimum RSSI), or the like), a number of satellites detected for GNSS positioning, accuracy requirements for positioning, a temperature of the device. (e.g., as determined to be the best for a particular installation or set of criteria), and/or other factors that may affect an ability to obtain data of the desired data type (e.g., positioning, temperature, humidity, chemical levels, etc.). In some embodiments, the LXI eligibility criteria may include whether a device has been recently used as the LXI, enabling the execution of rotational schemes within a cluster (e.g., round-robin or at least recently used schemes) for the role of LXI. In some embodiments, the eligibility criteria may be specific to different device types, so some device types may have different thresholds/criteria than others, which may be reflective of different device capabilities (e.g., battery capacity, sensor information, etc.) of the different device types. If the LXI eligibility criteria are not met, the process may then proceed to the non-LXI operations 414, which are described in more detail below. Otherwise, if LXI eligibility criteria are met, the device may then proceed with the functionality of the bidding/selection process 412.

The bidding/selection process 412 generally refers to the process of leader (LXI) selection regarding cluster-related data of one or more data types. In this process, each device in the cluster that meets the LXI eligibility may bid to become the LXI by listening for broadcasts from other devices while acquiring initial data. The first device to broadcast its initial data the rest of the cluster may then become the LXI for that data type. For example, in the case of positioning (in which an LPI is selected), the first device in the cluster that broadcasts a first fix (e.g., after powering on and performing the functionality at blocks 405 and 410) may then be selected as the LPI of the cluster. As such, each device may perform the functionality at block 420, in which it determines whether a broadcast is received before the initial data is obtained. If a device receives a broadcast with the data before the device obtains its own data, then it may proceed to the functionality of non-LXI operations 414 (again, described in more detail below). Otherwise, if a broadcast of the data is not received before the device obtains its own data, it may then proceed to the LXI operations 423 as the LXI of the cluster.

It can be noted that some embodiments may determine the LXI in view of additional or alternative characteristics to the device that first obtains and broadcasts the data. As noted below, there may be exceptions in certain circumstances and/or with certain devices (e.g., a plugged-in device or similar device may be designated as the LXI (or at least the initial LXI), e.g., until conditions change). Additionally or alternatively, in some embodiments and/or circumstances, devices may be designated as LXI based on one or more factors in addition or as an alternative to broadcasting the data first. These factors may include, for example, data accuracy, a certainty or ambiguity value associated with the data, sensor type/model/manufacturer/etc., device type/model/manufacturer/etc., a relative and/or absolute position of a device or sensor, a quality value associated with the data, or any combination thereof.

The LXI operations 423 begin with the device sending the acquired data to the cluster, as indicated at block 425. After doing so, the device can then check to determine whether a condition to relinquish leadership has been met, as indicated at block 430. Conditions to relinquish leadership may vary, depending on desired functionality. In some embodiments, there may be some overlap between the conditions to relinquish leadership and the LXI eligibility criteria discussed with regard to block 410. For example, a condition to relinquish leadership may comprise a condition that a threshold to meet LXI eligibility criteria is no longer met. This may comprise at least one battery level dropping below a threshold, a wireless connection being dropped or falling below at least one threshold QOS level one or more times, or the like. Additionally or alternatively, conditions to relinquish leadership may include conditions that may not be part of the LXI eligibility criteria. One such condition, for example, is whether an established time duration has elapsed. For example, to promote rotation of the LXI role among devices in a cluster, a bidding/selection process may be conducted periodically (e.g., after a preestablished duration of time has lapsed from when the current device has become the LXI). If a condition has not been met, the process may proceed to block 440, where the device waits until the next data acquisition time (e.g., as per a predetermined agile, periodicity, etc.). Once the weight is over, the device acquires new data, as indicated at block 445, then returns to block 425 to share the data, and the process at operations 425-445 may then repeat while the device remains the LXI of the group.

Otherwise, if a condition for relinquishing leadership has been met, the process may move from block 435 to block 450, where the device initiates a new bidding/selection process. According to some embodiments, the initiation of a new bidding/selection process may be proactively performed by the current LXI. For example, the current LXI may broadcast a message/signal to the other devices in the cluster, initiating a new bidding/selection process. Additionally or alternatively, according to some embodiments, the LXI may initiate new a bidding/selection process passively, by failing to broadcast/transmit data to other devices in the group (e.g., in the manner illustrated in blocks 440, 445, and 425, described above). In such embodiments, other devices in the cluster may then automatically enter into a bidding/ selection process if they detect that the current LXI has not shared newly-acquired data at a predetermined time at which the LXI is scheduled to share the data. This functionality may enable a cluster to ensure that the role of LXI is filled in cases where the LXI leaves the group (e.g., without actively indicating its departure to other devices), experiences difficulties acquiring and/or communicating newly-acquired data, and/or is otherwise unable to continue performing as LXI.

As indicated in FIG. 4, after initiating a new bidding/ selection process at block 450, a device may again determine whether it meets LXI eligibility criteria (at block 410) and may again participate in the bidding/selection process 412. Thus, a device that relinquishes leadership may again be selected as leader (LXI) if it again obtains and broadcasts acquired data before others in the cluster. Otherwise, if LXI eligibility criteria is not met, the device may then perform the non-LXI operations 414, where the device receives data from the LXI, as shown at block 460. Again, the broadcasting/receipt of data by the LXI/other devices within a cluster may be done in accordance with a predetermined schedule, periodicity, triggering event, etc., to help ensure all devices in the group receive the data. A non-LXI a device may then proceed to the functionality at block 465, where it determines whether a new bidding/selection process has been initiated. If so, the process may revert back to the functionality at block 410. Otherwise, the device can continue to perform non-LXI operations 414.

According to some embodiments, additional functionality may be performed by the LXI, which may not be shown in FIG. 4. For example, as indicated previously, the LXI may further report data to a remote device (e.g., server). Similar to sending data to other devices in the cluster, the LXI may send data to the remote device in accordance with a predetermined schedule, certain periodicity, triggering event, or any combination thereof. In some embodiments, a triggering event may comprise the LXI receiving a request from the server and/or a device in the cluster to communicate the data to the server.

It can be noted that devices in a cluster, including the LXI, may utilize data shared among the cluster in different ways, depending on desired functionality. For example, in some circumstances, devices in a cluster may obtain positioning information from an LPI of the cluster and engage in different location-based functionality. For example, a device determined to be a refrigerated shipping container or truck (e.g., based on location information) during shipping may not check its temperature as frequently as it would during other legs of the journey.

According to some embodiments, each device in a cluster may account for differences in the LXI and the device. For example, in the case of positioning, a device may receive a position from the LPI (e.g., the position of the LPI) to determine its own position (e.g., respective to the LPI). The device may determine its relative position to the LPI using sidelink, Bluetooth, mesh, and/or other wireless technologies, for example. Additionally or alternatively, Sidelink messaging or broadcast message protocols over cellular, Bluetooth, or RF mesh could be used to communicate to other trusted devices in the mesh/cluster/network/installation. Additionally or alternatively, if one or more values received by a device from an LXI exceed one or more threshold values, the device may double-check the data by obtaining new data on its own (e.g., new positioning, temperature, humidity data, etc.). According to some embodiments, devices may communicate to the LXI and/or to each other when a mismatch of data occurs for values provided by the LXI. If the mismatch exceeds a threshold number of devices in the cluster, a new LXI may be selected. This can help prevent an LXI that may not obtain accurate data (e.g., needs recalibrating) from continuing to propagate inaccurate data to the cluster.

In addition to determining the LPI, devices could also share individual asset conditions through the LPI (e.g. the specific vibration of a sensitive asset), aggregate asset conditions (e.g. ethylene levels in a fruit container), asset condition gradients (e.g. temperature gradients within a container of multiple vaccines, or humidity ranges in a container on board a ship at the sea, or vibration ranges for fragile cargo).

It can be noted that other embodiments may employ variations to the functionality illustrated in FIG. 4. Some embodiments may automatically establish a predesignated device as an LXI for one or more types of data, and use the functionality in FIG. 4 to re-establish the role of LXI if the predesignated device leaves the cluster. This can be the case, for example, in a factory where a predesignated device comprises a stationary device that is plugged in at the factory. Because it is plugged in, the predesignated device may be more suited for obtaining location and/or other types of data on behalf of a cluster of devices (e.g., on a shipping pallet) to preserve battery life of the devices in the cluster while the cluster is in the factory. However, once the cluster leaves the factory (e.g., for shipping on a truck, train, etc.) and is no longer within range of the predesignated device, the devices in the group may execute the functionality illustrated in FIG. 4 to designate a new LXI. According to some embodiments, a device may be nominated by the operations/business layer be the LXI cluster for a fixed or arbitrary time before assigning to others automatically as per the process in FIG. 4.

Figure 5:
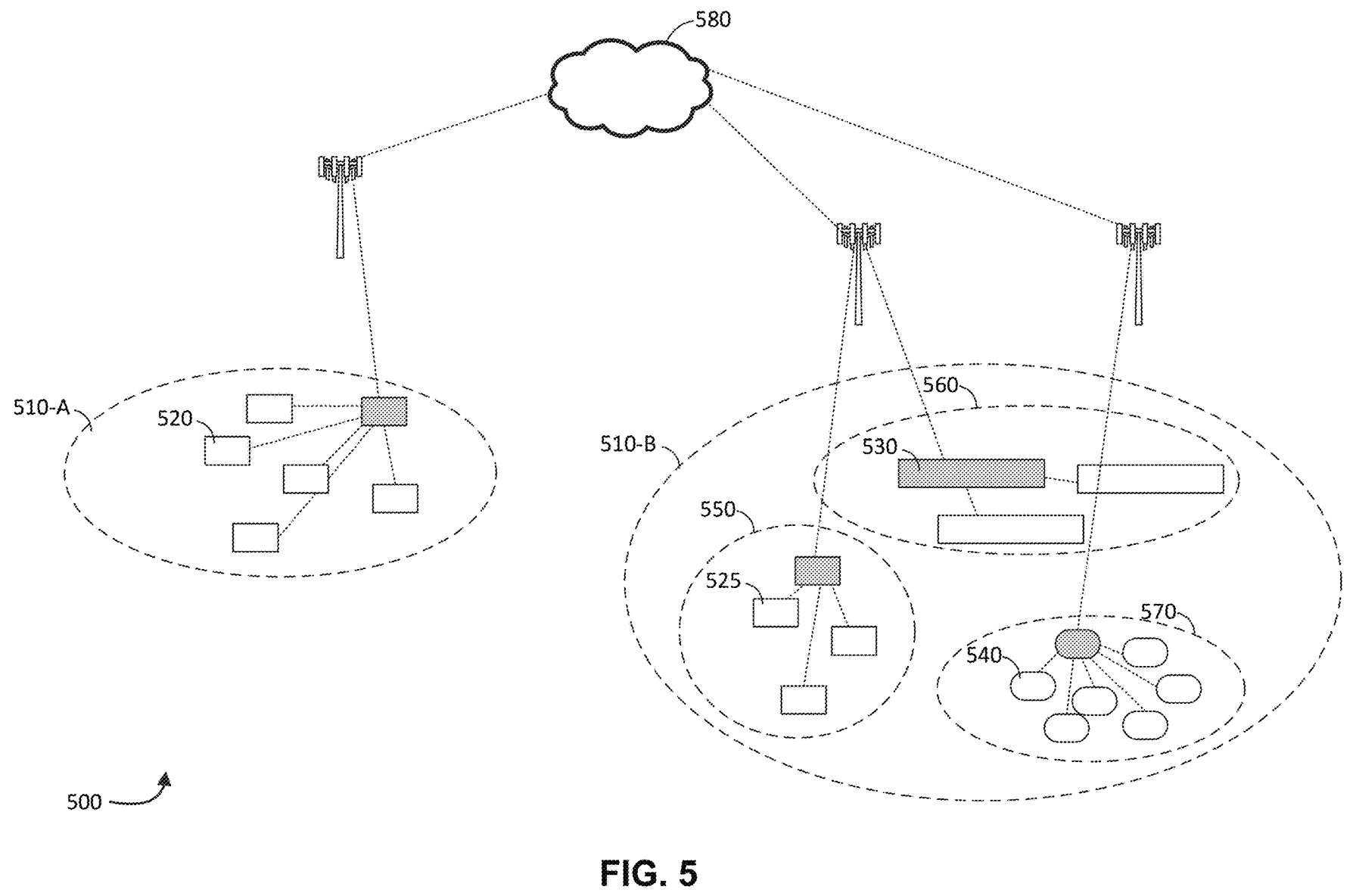

FIG. 5 is a diagram of an example system 500 that shows how LXIs may be assigned differently for homogenous and heterogeneous clusters. Here, a first cluster 510-A represents a homogenous group of devices 520, and a second cluster 510-B represents a heterogeneous group, in which devices 525, 530, and 540 are part of respective sub-clusters 550, 560, and 570. Similar to previous figures, devices in gray represent LXIs of a cluster or subcluster, and the role of LXI may rotate between devices of a cluster or subcluster, as described above (particularly with respect to FIG. 4). Because the first cluster 510-A includes devices 520 of the same device type, they may have the same reporting requirements. Thus, a single leader device may report to the cloud 580 on behalf of the whole cluster 510-A. On the other hand, because devices 525, 530, and 540 of the second cluster 510-B may have different reporting requirements with respect to one or more data types (e.g., positioning, temperature, etc.), a different LXI for the one or more data types may be selected for the clusters 550, 560, and 570, as illustrated.

That said, not all differing device types may have different reporting requirements. If devices of different device types have the same reporting requirements, then devices of different types may be included in the same cluster or subcluster. For this and/or other reasons, devices in the second cluster 510-B may have different sub-clusters for different data types. For example, different sub-clusters of second cluster 510-B may be formed by (i) devices that need temperature reporting and (ii) devices that do not need temperature reporting. On the other hand, all devices of the second cluster 510-B may have similar reporting requirements with respect to positioning, and therefore a single positioning leader (LPI) may be selected for the entire second cluster 510-B (e.g., no sub-clusters are formed with respect to positioning).

Figure 6:
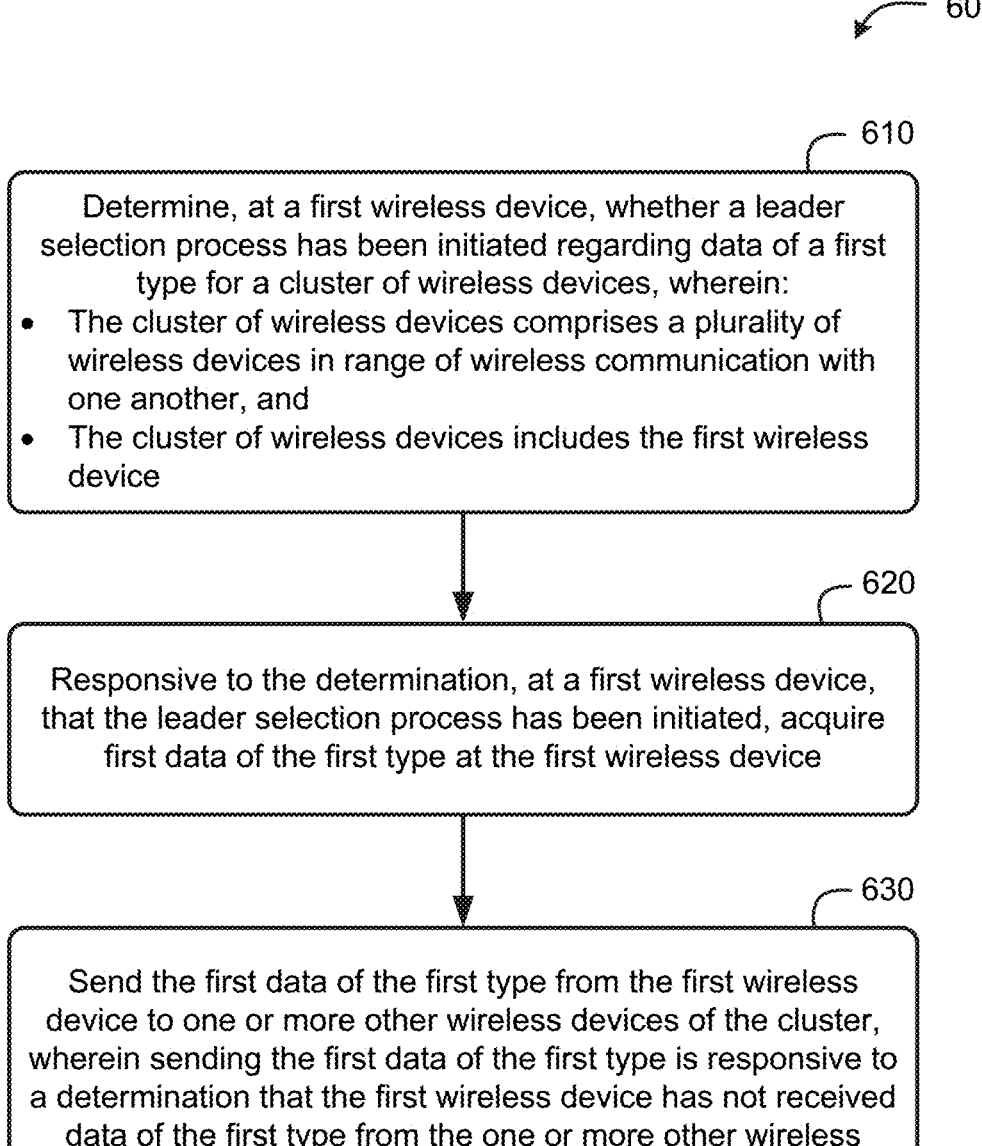
FIG. 6 is a flow diagram of a method of cooperative data sharing among wireless devices, according to an embodiment.

FIG. 6 is a flow diagram of a method 600 of cooperative data sharing among wireless devices, according to an embodiment. The operations illustrated in the various blocks of FIG. 6 may be performed by a first wireless device, which may comprise a device in a cluster. Aspects of the method 600 may reflect the functionality of the device in the previously-described embodiments, including the process illustrated in FIG. 4. Example hardware and/or software components of an example device are illustrated in FIG. 7, which is described in more detail below.

At block 610, the functionality comprises determining, at a first wireless device, whether a leader selection process has been initiated regarding data of a first type for a cluster of wireless devices, wherein: the cluster of wireless devices comprises a plurality of wireless devices in range of wireless communication with one another, and the cluster of wireless devices includes the first wireless device. As noted in the embodiments herein, a cluster of devices may include a homogenous of devices of a same device type or a heterogeneous group of devices of different device types. As described in the embodiments above, data may comprise any of a variety of types of data that may be relevant to a cluster. This can include data regarding positioning and/or sensing for the cluster, or other cluster-related data (e.g., data that is or may be relevant to each device in a cluster). As such, according to some embodiments, the first type of data may comprise data indicative of a position of the first wireless device, sensor data from one or more sensors of the first wireless device, contextual data for the first wireless device, or any combination thereof. Depending on desired functionality, the data indicative of the position of the first wireless device may comprise data indicative of an absolute position and/or a relative position. Data indicative of a relative position may also include data indicative of a reference point. In some embodiments, the sensor data may comprise data indicative of temperature, moisture, pressure, light, sound, movement, altitude, orientation, a fluid property, a detected chemical, a magnetic field, harvested energy, or any combination thereof. With respect to harvested energy, Piezoelectric, thermal, photovoltaic, mechanical energy, or any combination thereof, are possible types of energy that can be harvested, for example. The amplitude and the availability of these classes of inputs may determine the amounts of energy that can be harvested in these devices. Once the energy is harvested, it may be converted and stored in one or more batteries, super capacitors, other storage devices, or a combination thereof, on board the device. This information can be shared as needed between the devices or to the cloud server as part of its routine message payload to extend the functionality of the device, or used for other needs. For example, this data may be used to force an LXI handover to a specific device that is or has recently reported high harvested energy relative to other devices (e.g., the current LXI).

In some embodiments sensor data may include proximity to one or more other devices (e.g., as determined by a received signal strength indicator (RSSI) or other signal strength, round-trip time (RTT), or the like). In some embodiments, the sensor data may comprise one or more values derived from raw sensor data. For example, according to some embodiments, the sensor data may comprise, for a set of sensor data values: an average, a mean, a standard deviation, a maximum, a minimum, or a combination thereof. As previously noted, according to some embodiments, the position of the first wireless device may comprise a coarse position fix (e.g., a first fix). This can be extended to other (non-positioning) information types, where the LXI is determined to be the device that first provides information (e.g., "coarse information"). Further, as noted above, entering the bidding/selection process may be done after determining whether LXI eligibility criteria have been met. As such, according to some embodiments, acquiring the first data of the first type at the first wireless device may be further responsive to determining, at the first wireless device, that the first wireless device meets one or more leadership criteria.

Figure 7:
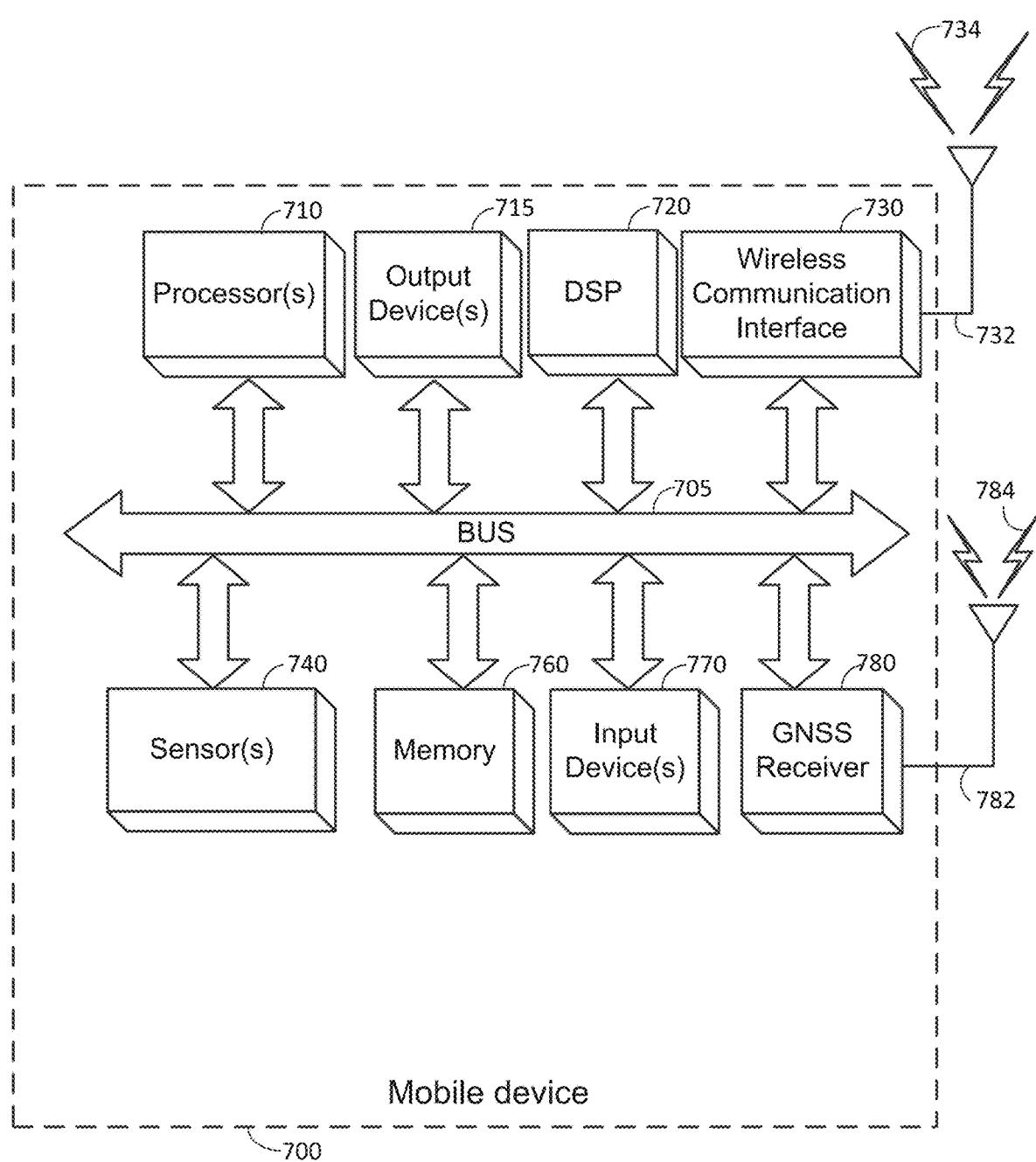
FIG. 7 is a block diagram of an embodiment of a mobile device.

Means for performing functionality at block 610 may comprise a bus 705, processor(s) 710, digital signal processor (DSP) 720, wireless communication interface 730, one or more sensors 740, memory 760, GNSS receiver 780, and/or other components of a mobile device 700, as illustrated in FIG. 7 and described in more detail below.

At block 620, the functionality comprises, responsive to the determination, at a first wireless device, that the leader selection process has been initiated, acquiring first data of the first type at the first wireless device. This functionality may echo the functionality of block 415 in FIG. 4, described above. This functionality may vary depending on the type data acquired. Acquiring a position may comprise performing GNSS measurements, and acquiring other types of positioning may comprise sending and/or receiving RF signals to one or more other devices (e.g., base stations, Wi-Fi access points, etc.). Acquiring sensor data may comprise activating answers and/or sampling sensor output.

Means for performing functionality at block 620 may comprise a bus 705, processor(s) 710, digital signal processor (DSP) 720, wireless communication interface 730, one or more sensors 740, memory 760, GNSS receiver 780, and/or other components of a mobile device 700, as illustrated in FIG. 7 and described in more detail below.

At block 630, the functionality comprises sending the first data of the first type from the first wireless device to one or more other wireless devices of the cluster, wherein sending the first data of the first type is responsive to a determination that the first wireless device has not received data of the first type from the one or more other wireless devices of the cluster subsequent to determining that the leader selection process has been initiated. This functionality may correspond with the functionality of blocks 420 and 425 of FIG. 4, for example.

Means for performing functionality at block 630 may comprise a bus 705, processor(s) 710, digital signal processor (DSP) 720, wireless communication interface 730, one or more sensors 740, memory 760, GNSS receiver 780, and/or other components of a mobile device 700, as illustrated in FIG. 7 and described in more detail below.

As described herein, embodiments may include one or more additional features, depending on desired functionality. The leader device may report data to other devices in a cluster and/or to a remote device. As such, according to some embodiments, the method may further comprise, subsequent to sending the first data of the first type, acquiring second data of the first type at the first wireless device, and sending the first data of the first type from the first wireless device to one or more other wireless devices of the cluster. Additionally or alternatively, the method may further comprise sending the first data of the first type from the first wireless device to a server via a wireless network. According to some embodiments, method may further comprise, subsequent to sending the first data of the first type determining that a condition has been met by the first wireless device for relinquishing leadership, and responsive to determining that the condition has been met, indicating to the one or more other wireless devices of the cluster that the first wireless device is no longer leader regarding data of the first type for the cluster. This indication may comprise sending a message to the one or more other wireless devices and/or refraining to send subsequent data of the first type from the first wireless device to the one or more other wireless devices at a scheduled time for sending the subsequent data of the first type. As noted in the embodiments herein, this can trigger a subsequent bidding/selection process. According to some embodiments, the condition may comprise at least one passing of a threshold duration of time, at least one battery level of the first wireless device falling below a threshold value, an inability of the first wireless devices to obtain the subsequent data of the first type, a determination that, for at least one or more times, the subsequent data falls below at least one threshold quality value, a determination that the first wireless device is no longer connected to a wireless network, a determination that a Quality of Service (QOS) metric regarding a connection a wireless network has fallen below at least one threshold level, a condition related to at least one limitation of a wireless subscription of the first wireless device, or any combination thereof. Other devices may comprise leaders of the cluster for other data types. As such, some embodiments may further comprise receiving, at the first wireless device, data of a second type from a second wireless devices of the cluster subsequent to determining that the leader selection process has been initiated. According to some embodiments, determining that the leader selection process has been initiated for the cluster of wireless devices a comprise determining that the first wireless device has not received data of the first type from another wireless device of the cluster for at least a threshold duration of time.

FIG. 7 is a block diagram of an embodiment of a mobile device 700, which can be utilized as described herein above (e.g., in association with the previously described figures). For example, the mobile device 700 may be utilized as and/or correspond with a mobile device of a cluster, including one that performs the role of a leader device (e.g., LXI) for a period of time, which may include device(s) 105*a* and 105*b* of FIG. 1; devices in clusters 210 of FIG. 2; devices 320, 330, 335, 340, 345, 350, and 355 of FIGS. 3A-3C; devices 520, 525, 530, and 540 of FIG. 5; or the like, including devices that perform the methods of FIGS. 4 and 6. It should be noted that FIG. 7 is meant only to provide a generalized illustration of various components, any or all of which may be utilized as appropriate. Furthermore, the functionality of a mobile device described herein may be executed by one or more of the hardware and/or software components illustrated in FIG. 7.

The mobile device 700 is shown comprising hardware elements that can be electrically coupled via a bus 705 (or may otherwise be in communication, as appropriate). The hardware elements may include a processor(s) 710 which can include without limitation one or more general-purpose processors (e.g., an application processor), one or more special-purpose processors (such as digital signal processor (DSP) chips, graphics acceleration processors, application specific integrated circuits (ASICs), and/or the like), and/or other processing structures or means. Processor(s) 710 may comprise one or more processing units, which may be housed in a single integrated circuit (IC) or multiple ICs. As shown in FIG. 7, some embodiments may have a separate DSP 720, depending on desired functionality. Location determination and/or other determinations based on wireless communication may be provided in the processor(s) 710 and/or wireless communication interface 730 (discussed below). The mobile device 700 also can include one or more input devices 770, which can include without limitation one or more keyboards, touch screens, touch pads, microphones, buttons, dials, switches, and/or the like; and one or more output devices 715, which can include without limitation one or more displays (e.g., touch screens), light emitting diodes (LEDs), speakers, and/or the like.

The mobile device 700 may also include a wireless communication interface 730, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMAX device, a WAN device, and/or various cellular devices, etc.), and/or the like, which may enable the mobile device 700 to communicate with other devices as described in the embodiments above. The wireless communication interface 730 may permit data and signaling to be communicated (e.g., transmitted and received) with transmission/reception points (TRPs) of a network, for example, via eNBs, gNBs, ng-eNBs, access points, various base stations and/or other access node types, and/or other network components, computer systems, and/or any other electronic devices communicatively coupled with TRPs, as described herein. The communication can be carried out via one or more wireless communication antenna(s) 732 that send and/or receive wireless signals 734. According to some embodiments, the wireless communication antenna(s) 732 may comprise a plurality of discrete antennas, antenna arrays, or any combination thereof. The antenna(s) 732 may be capable of transmitting and receiving wireless signals using beams (e.g., Tx beams and Rx beams). Beam formation may be performed using digital and/or analog beam formation techniques, with respective digital and/or analog circuitry. The wireless communication interface 730 may include such circuitry.

Depending on desired functionality, the wireless communication interface 730 may comprise a separate receiver and transmitter, or any combination of transceivers, transmitters, and/or receivers to communicate with base stations (e.g., ng-eNBs and gNBs) and other terrestrial transceivers, such as wireless devices and access points. The mobile device 700 may communicate with different data networks that may comprise various network types. For example, one such network type may comprise a wireless wide area network (WWAN), which may be a code-division multiple access (CDMA) network, a time division multiple access (TDMA) network, a frequency division multiple access (FDMA) network, an orthogonal frequency division multiple access (OFDMA) network, a single-carrier frequency division multiple access (SC-FDMA) network, a WiMAX (IEEE 802.16) network, and so on. A CDMA network may implement one or more radio access technologies (RATs) such as CDMA2000®, wideband code division multiple access (WCDMA), and so on. CDMA2000® includes IS-95, IS-2000 and/or IS-856 standards. A TDMA network may implement global system for mobile communications (GSM), digital advanced mobile phone system (D-AMPS), or some other RAT. An OFDMA network may employ long-term evolution (LTE), LTE Advanced, fifth-generation (5G) new radio (NR), and so on. 5G NR, LTE, LTE Advanced, GSM, and WCDMA are described in documents from 3rd Generation Partnership Project (3GPP). CDMA2000® is described in documents from a consortium named "3rd Generation Partnership Project 2" (3GPP2). 3GPP and 3GPP2 documents are publicly available. A wireless local area network (WLAN) may also be an IEEE 802.11x network, and a wireless personal area network (WPAN) may be a Bluetooth network, an IEEE 802.15x, or some other type of network. The techniques described herein may also be used for any combination of WWAN, WLAN and/or WPAN.

The mobile device 700 can further include sensor(s) 740. Sensor(s) 740 may comprise, without limitation, one or more inertial sensors and/or other sensors (e.g., accelerometer(s), gyroscope(s), camera(s), magnetometer(s), altimeter (s), microphone(s), proximity sensor(s), light sensor(s), barometer(s), and the like), some of which may be used to obtain position-related measurements for sensor-assisted positioning and/or other information (e.g., for determining an approximate location of a the mobile device 700, as described herein).

Embodiments of the mobile device 700 may also include a GNSS receiver 780 capable of receiving signals 784 from one or more GNSS satellites using an antenna 782 (which could be the same as antenna 732). Positioning based on GNSS signal measurement can be utilized to complement and/or incorporate the techniques described herein. The GNSS receiver 780 can extract the position of the mobile device 700, using conventional techniques, from GNSS satellites of a GNSS system, such as Global Positioning System (GPS), Galileo, GLONASS, Quasi-Zenith Satellite System (QZSS) over Japan, IRNSS over India, BeiDou Navigation Satellite System (BDS), and/or the like. Moreover, the GNSS receiver 780 can be used with various augmentation systems (e.g., a Satellite Based Augmentation System (SBAS)) that may be associated with or otherwise enabled for use with one or more global and/or regional navigation satellite systems, such as, e.g., Wide Area Augmentation System (WAAS), European Geostationary Navigation Overlay Service (EGNOS), Multi-functional Satellite Augmentation System (MSAS), and Geo Augmented Navigation system (GAGAN), and/or the like.

It can be noted that, although GNSS receiver 780 is illustrated in FIG. 7 as a distinct component, embodiments are not so limited. As used herein, the term "GNSS receiver" may comprise hardware and/or software components configured to obtain GNSS measurements (measurements from GNSS satellites). In some embodiments, therefore, the GNSS receiver may comprise a measurement engine executed (as software) by one or more processors, such as processor(s) 710, DSP 720, and/or a processor within the wireless communication interface 730 (e.g., in a modem). A GNSS receiver may optionally also include a positioning engine, which can use GNSS measurements from the measurement engine to determine the position of the GNSS receiver using an Extended Kalman Filter (EKF), Weighted Least Squares (WLS), particle filter, or the like. The positioning engine may also be executed by one or more processors, such as processor(s) 710 or DSP 720.

The mobile device 700 may further include and/or be in communication with at least one memory 760. The memory 760 can include, without limitation, local and/or network accessible storage, a disk drive, a drive array, an optical storage device, a solid-state storage device, such as a random access memory (RAM), and/or a read-only memory (ROM), which can be programmable, flash-updateable, and/or the like. Such storage devices may be configured to implement any appropriate data stores, including without limitation, various file systems, database structures, and/or the like.

The memory 760 of the mobile device 700 also can comprise software elements (not shown in FIG. 7), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 760 that are executable by the mobile device 700 (and/or processor(s) 710 or DSP 720 within mobile device 700). In some embodiments, then, such code and/or instructions can be used to configure and/or adapt a general-purpose computer (or other device) to perform one or more operations in accordance with the described methods.

Figure 8:
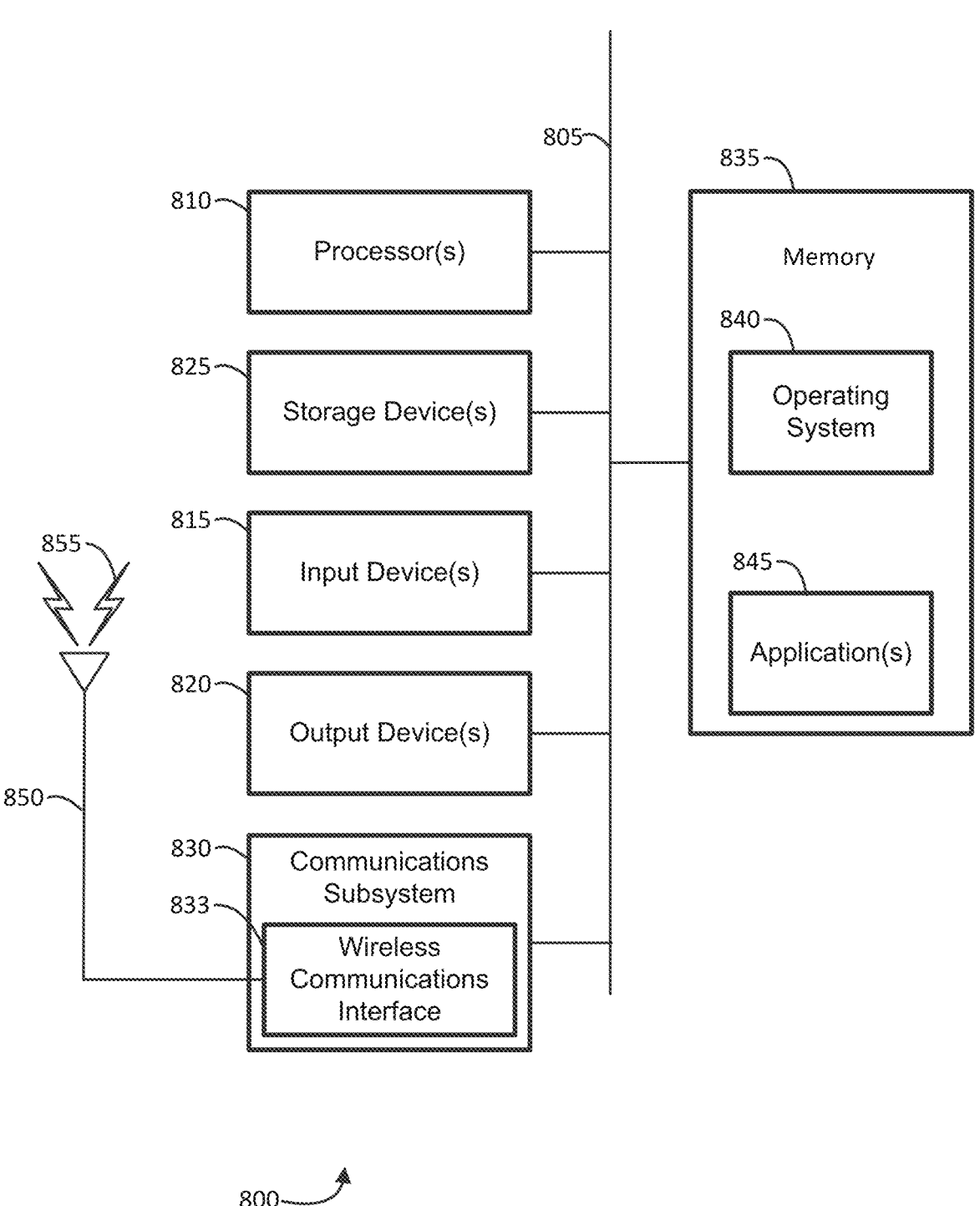
FIG. 8 is a block diagram of an embodiment of a computer system.

FIG. 8 is a block diagram of an embodiment of a computer system 800, which may be used, in whole or in part, to provide the functions of one or more components and/or devices as described in the embodiments herein, including a server and/or services in the cloud. Thus, the computer system 800 may be utilized as and/or correspond with, for example, a network function server 160 and/or external client 180 of FIG. 1, cloud 220 of FIG. 2, cloud 580 of FIG. 5, and/or a cloud, server, and/or remote device, or any combination thereof, as described herein. The computer system 800 may include, for example, a computer server, personal computer, personal electronic device, or the like. It should be noted that FIG. 8 is meant only to provide a generalized illustration of various components, any or all of which may be utilized as appropriate. FIG. 8, therefore, broadly illustrates how individual system elements may be implemented in a relatively separated or relatively more integrated manner. In addition, it can be noted that components illustrated by FIG. 8 can be localized to a single device and/or distributed among various networked devices, which may be disposed at different geographical locations.

The computer system 800 is shown comprising hardware elements that can be electrically coupled via a bus 805 (or may otherwise be in communication, as appropriate). The hardware elements may include processor(s) 810, which may comprise without limitation one or more general-purpose processors, one or more special-purpose processors (such as digital signal processing chips, graphics acceleration processors, and/or the like), and/or other processing structure, which can be configured to perform one or more of the methods described herein. The computer system 800 also may comprise one or more input devices 815, which may comprise without limitation a mouse, a keyboard, a camera, a microphone, and/or the like; and one or more output devices 820, which may comprise without limitation a display device, a printer, and/or the like.

The computer system 800 may further include (and/or be in communication with) one or more non-transitory storage devices 825, which can comprise, without limitation, local and/or network accessible storage, and/or may comprise, without limitation, a disk drive, a drive array, an optical storage device, a solid-state storage device, such as a random-access memory (RAM) and/or read-only memory (ROM), which can be programmable, flash-updateable, and/or the like. Such storage devices may be configured to implement any appropriate data stores, including without limitation, various file systems, database structures, and/or the like. Such data stores may include database(s) and/or other data structures used store and administer messages and/or other information to be sent to one or more devices via hubs, as described herein.

The computer system 800 may also include a communications subsystem 830, which may comprise wireless communication technologies managed and controlled by a wireless communication interface 833, as well as wired technologies (such as Ethernet, coaxial communications, universal serial bus (USB), and the like). The wireless communication interface 833 may comprise one or more wireless transceivers that may send and receive wireless signals 855 (e.g., signals according to 5G NR or LTE) via wireless antenna(s) 850. Thus the communications subsystem 830 may comprise a modem, a network card (wireless or wired), an infrared communication device, a wireless communication device, and/or a chipset, and/or the like, which may enable the computer system 800 to communicate on any or all of the communication networks described herein to any device on the respective network, including a User Equipment (UE), base stations and/or other transmission reception points (TRPs), and/or any other electronic devices described herein. Hence, the communications subsystem 830 may be used to receive and send data as described in the embodiments herein.

In many embodiments, the computer system 800 will further comprise a working memory 835, which may comprise a RAM or ROM device, as described above. Software elements, shown as being located within the working memory 835, may comprise an operating system 840, device drivers, executable libraries, and/or other code, such as one or more applications 845, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 825 described above. In some cases, the storage medium might be incorporated within a computer system, such as computer system 800. In other embodiments, the storage medium might be separate from a computer system (e.g., a removable medium, such as an optical disc), and/or provided in an installation package, such that the storage medium can be used to program, configure, and/or adapt a general purpose computer with the instructions/code stored thereon. These instructions might take the form of executable code, which is executable by the computer system 800 and/or might take the form of source and/or installable code, which, upon compilation and/or installation on the computer system 800 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processors and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media and volatile media. Common forms of computer-readable media include, for example, magnetic and/or optical media, any other physical medium with patterns of holes, a RAM, a programmable ROM (PROM), erasable PROM (EPROM), a FLASH-EPROM, any other memory chip or cartridge, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussion utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the scope of the disclosure. For example, the above elements may merely be a component of a larger system, wherein other rules may take precedence over or otherwise modify the application of the various embodiments. Also, a number of steps may be undertaken before, during, or after the above elements are considered. Accordingly, the above description does not limit the scope of the disclosure.

In view of this description, embodiments may include different combinations of features. Implementation examples are described in the following numbered clauses:

Clause 1: A method of cooperative data sharing among wireless devices, the method comprising: determining, at a first wireless device, whether a leader selection process has been initiated regarding data of a first type for a cluster of wireless devices, wherein: the cluster of wireless devices comprises a plurality of wireless devices in range of wireless communication with one another, and the cluster of wireless devices includes the first wireless device; responsive to the determination, at a first wireless device, that the leader selection process has been initiated, acquiring first data of the first type at the first wireless device; and sending the first data of the first type from the first wireless device to one or more other wireless devices of the cluster, wherein sending the first data of the first type is responsive to a determination that the first wireless device has not received data of the first type from the one or more other wireless devices of the cluster subsequent to determining that the leader selection process has been initiated.

Clause 2: The method of clause 1, further comprising, subsequent to sending the first data of the first type: acquiring second data of the first type at the first wireless device; and sending the first data of the first type from the first wireless device to the one or more other wireless devices of the cluster.

Clause 3: The method of any one of clauses 1-2 further comprising sending the first data of the first type from the first wireless device to a server via a wireless network.

Clause 4: The method of any one of clauses 1-3 further comprising, subsequent to sending the first data of the first type determining that a condition has been met by the first wireless device for relinquishing leadership; and responsive to determining that the condition has been met, indicating to the one or more other wireless devices of the cluster that the first wireless device is no longer leader regarding data of the first type for the cluster.

Clause 5: The method of clause 4 wherein the condition comprises: at least one passing of a threshold duration of time, at least one battery level of the first wireless device falling below a threshold value, an inability of the first wireless devices to obtain subsequent data of the first type, a determination that subsequent data falls below at least one threshold quality value, a determination that the first wireless device is no longer connected to a wireless network, a determination that a Quality of Service (QOS) metric regarding a connection a wireless network has fallen below at least one threshold level, a condition related to at least one limitation of a wireless subscription of the first wireless device, or any combination thereof.

Clause 6: The method of any one of clauses 1-5 wherein the first data of the first type comprises data indicative of: a position of the first wireless device, sensor data from one or more sensors of the first wireless device, contextual data for the first wireless device, or any combination thereof.

Clause 7: The method of clause 6 wherein the sensor data comprises data indicative of: temperature, moisture, pressure, light, sound, movement, altitude, orientation, a fluid property, a detected chemical, a magnetic field, harvested energy, or any combination thereof.

Clause 8: The method of any one of clauses 6-7 wherein the sensor data comprises, for a set of sensor data values: an average, a mean, a standard deviation, a maximum, a minimum, or a combination thereof.

Clause 9: The method of any one of clauses 6-8 wherein the position of the first wireless device comprises a coarse position fix.

Clause 10: The method of any one of clauses 1-9 further comprising receiving, at the first wireless device, data of a second type from a second wireless device of the cluster subsequent to determining that the leader selection process has been initiated.

Clause 11: The method of any one of clauses 1-10 wherein determining that the leader selection process has been initiated for the cluster of wireless devices comprises determining that the first wireless device has not received data of the first type from another wireless device of the cluster for at least one threshold duration of time.

Clause 12: The method of any one of clauses 1-11 wherein acquiring the first data of the first type at the first wireless device is further responsive to determining, at the first wireless device, that the first wireless device meets one or more leadership criteria.

Clause 13: A first wireless device for cooperative data sharing among wireless devices, the first wireless device comprising: at least one transceiver; at least one memory; and one or more processors communicatively coupled with the transceiver and the memory, wherein the one or more processors are configured to: determine whether a leader selection process has been initiated regarding data of a first type for a cluster of wireless devices, wherein: the cluster of wireless devices comprises a plurality of wireless devices in range of wireless communication with one another, and the cluster of wireless devices includes the first wireless device; responsive to the determination that the leader selection process has been initiated, acquire first data of the first type; and send the first data of the first type via the transceiver to one or more other wireless devices of the cluster, wherein sending the first data of the first type is responsive to a determination that the first wireless device has not received data of the first type from the one or more other wireless devices of the cluster subsequent to determining that the leader selection process has been initiated.

Clause 14: The first wireless device of clause 13, wherein the one or more processors are further configured to, subsequent to sending the first data of the first type: acquire second data of the first type at the first wireless device; and send the first data of the first type via the transceiver to the one or more other wireless devices of the cluster.

Clause 15: The first wireless device of any one of clauses 13-14 wherein the one or more processors are further configured to send the first data of the first type from the first wireless device to a server via a wireless network.

Clause 16: The first wireless device of any one of clauses 13-15 wherein the one or more processors are further configured to, subsequent to sending the first data of the first type: determine that a condition has been met by the first wireless device for relinquishing leadership; and responsive to determining that the condition has been met, indicate to the one or more other wireless devices of the cluster that the first wireless device is no longer leader regarding data of the first type for the cluster.

Clause 17: The first wireless device of clause 16 wherein, to determine that the condition has been met, the one or more processors are configured to determine at least one passing of a threshold duration of time, at least one battery level of the first wireless device falling below a threshold value, an inability of the first wireless devices to obtain subsequent data of the first type, subsequent data falls below at least one threshold quality value, the first wireless device is no longer connected to a wireless network, a Quality of Service (QOS) metric regarding a connection a wireless network has fallen below at least one threshold level, a condition related to at least one limitation of a wireless subscription of the first wireless device, or any combination thereof.

Clause 18: The first wireless device of any one of clauses 13-17 wherein, to send the first data of the first type, the one or more processors are configured to send data indicative of a position of the first wireless device, sensor data from one or more sensors of the first wireless device, contextual data for the first wireless device, or any combination thereof.

Clause 19: The first wireless device of clause 18 wherein the first wireless device further comprises the one or more sensors, and, to obtain the sensor data, the one or more sensors are configured to obtain data indicative of: temperature, moisture, pressure, light, sound, movement, altitude, orientation, a fluid property, a detected chemical, a magnetic field, harvested energy, or any combination thereof.

Clause 20: The first wireless device of any one of clauses 18-19 wherein the first wireless device further comprises the one or more sensors, and, to obtain the sensor data, the one or more sensors are configured to obtain, for a set of sensor data values: an average, a mean, a standard deviation, a maximum, a minimum, or a combination thereof.

Clause 21: The first wireless device of any one of clauses 18-20 wherein, to send data indicative of the position of the first wireless device, the one or more processors are configured to send data indicative of a coarse position fix.

Clause 22: The first wireless device of any one of clauses 13-21 wherein the one or more processors are further configured to receive data of a second type from a second wireless device of the cluster subsequent to determining that the leader selection process has been initiated.

Clause 23: The first wireless device of any one of clauses 13-22 wherein, to determine that the leader selection process has been initiated for the cluster of wireless devices, the one or more processors are configured to determine that the first wireless device has not received data of the first type from another wireless device of the cluster for at least one threshold duration of time.

Clause 24: The first wireless device of any one of clauses 13-23 wherein the one or more processors are configured to acquire the first data of the first type at the first wireless device further responsive to a determination that the first wireless device meets one or more leadership criteria.

Clause 25: An apparatus for cooperative data sharing among wireless devices, the apparatus comprising: means for determining whether a leader selection process has been initiated regarding data of a first type for a cluster of wireless devices, wherein: the cluster of wireless devices comprises a plurality of wireless devices in range of wireless communication with one another, and the cluster of wireless devices includes a first wireless device; means for acquiring first data of the first type, responsive to the determination that the leader selection process has been initiated; and means for sending the first data of the first type from the first wireless device to one or more other wireless devices of the cluster, wherein sending the first data of the first type is responsive to a determination that the first wireless device has not received data of the first type from the one or more other wireless devices of the cluster subsequent to determining that the leader selection process has been initiated.

Clause 26: The apparatus of clause 25, further comprising: means for acquiring second data of the first type, subsequent to sending the first data of the first type; and means for sending the first data of the first type to one or more other wireless devices of the cluster, subsequent to sending the first data of the first type.

Clause 27: The apparatus of any one of clauses 25-26 further comprising means for sending the first data of the first type from the first wireless device to a server via a wireless network.

Clause 28: The apparatus of any one of clauses 25-27 further comprising means for determining, subsequent to sending the first data of the first type, that a condition has been met by the first wireless device for relinquishing leadership; and means for, responsive to determining that the condition has been met, indicating to the one or more other wireless devices of the cluster that the first wireless device is no longer leader regarding data of the first type for the cluster.

Clause 29: The apparatus of any one of clauses 25-28 further comprising means for receiving data of a second type from a second wireless device of the cluster subsequent to determining that the leader selection process has been initiated.

Clause 30: A non-transitory computer-readable medium storing instructions for cooperative data sharing among wireless devices, the instructions comprising code for: determining whether a leader selection process has been initiated regarding data of a first type for a cluster of wireless devices, wherein: the cluster of wireless devices comprises a plurality of wireless devices in range of wireless communication with one another, and the cluster of wireless devices includes a first wireless device; responsive to the determination that the leader selection process has been initiated, acquiring first data of the first type at the first wireless device; and sending the first data of the first type from the first wireless device to one or more other wireless devices of the cluster, wherein sending the first data of the first type is responsive to a determination that the first wireless device has not received data of the first type from the one or more other wireless devices of the cluster subsequent to determining that the leader selection process has been initiated.

Clause 31: An apparatus having means for performing the method of any one of clauses 1-12.

Clause 32: A non-transitory computer-readable medium storing instructions, the instructions comprising code for performing the method of any one of clauses 1-12.

What is claimed is:

1. A method of cooperative data sharing among wireless devices, the method comprising:
determining, at a first wireless device, whether a leader selection process has been initiated regarding data of a first type for a cluster of wireless devices, wherein:
the cluster of wireless devices comprises a plurality of wireless devices in range of wireless communication with one another, and
the cluster of wireless devices includes the first wireless device;
responsive to the determination, at a first wireless device, that the leader selection process has been initiated, acquiring first data of the first type at the first wireless device; and
sending the first data of the first type from the first wireless device to one or more other wireless devices of the cluster, wherein sending the first data of the first type is responsive to a determination that the first wireless device has not received data of the first type from the one or more other wireless devices of the cluster subsequent to determining that the leader selection process has been initiated.

2. The method of claim 1, further comprising, subsequent to sending the first data of the first type:

acquiring second data of the first type at the first wireless device; and sending the first data of the first type from the first wireless device to the one or more other wireless devices of the cluster.

3. The method of claim 1, further comprising sending the first data of the first type from the first wireless device to a server via a wireless network.

4. The method of claim 1, further comprising, subsequent to sending the first data of the first type:

determining that a condition has been met by the first wireless device for relinquishing leadership; and responsive to determining that the condition has been met, indicating to the one or more other wireless devices of the cluster that the first wireless device is no longer leader regarding data of the first type for the cluster.

5. The method of claim 4, wherein the condition comprises:

at least one passing of a threshold duration of time, at least one battery level of the first wireless device falling below a threshold value, an inability of the first wireless devices to obtain subsequent data of the first type, a determination that subsequent data falls below at least one threshold quality value, a determination that the first wireless device is no longer connected to a wireless network, a determination that a Quality of Service (QOS) metric regarding a connection a wireless network has fallen below at least one threshold level, a condition related to at least one limitation of a wireless subscription of the first wireless device, or any combination thereof.

6. The method of claim 1, wherein the first data of the first type comprises data indicative of:

a position of the first wireless device, sensor data from one or more sensors of the first wireless device, contextual data for the first wireless device, or any combination thereof.

7. The method of claim 6, wherein the sensor data comprises data indicative of:

temperature, moisture, pressure, light, sound, movement, altitude, orientation, a fluid property, a detected chemical, a magnetic field, harvested energy, or any combination thereof.

8. The method of claim 6, wherein the sensor data comprises, for a set of sensor data values:

an average, a mean, a standard deviation, a maximum, a minimum, or a combination thereof.

9. The method of claim 6, wherein the position of the first wireless device comprises a coarse position fix.

10. The method of claim 1, further comprising receiving, at the first wireless device, data of a second type from a second wireless device of the cluster subsequent to determining that the leader selection process has been initiated.

11. The method of claim 1, wherein determining that the leader selection process has been initiated for the cluster of wireless devices comprises determining that the first wireless device has not received data of the first type from another wireless device of the cluster for at least one threshold duration of time.

12. The method of claim 1, wherein acquiring the first data of the first type at the first wireless device is further responsive to determining, at the first wireless device, that the first wireless device meets one or more leadership criteria.

13. A first wireless device for cooperative data sharing among wireless devices, the first wireless device comprising:

at least one transceiver;

at least one memory; and one or more processors communicatively coupled with the transceiver and the memory, wherein the one or more processors are configured to:

determine whether a leader selection process has been initiated regarding data of a first type for a cluster of wireless devices, wherein:

the cluster of wireless devices comprises a plurality of wireless devices in range of wireless communication with one another, and the cluster of wireless devices includes the first wireless device;

responsive to the determination that the leader selection process has been initiated, acquire first data of the first type; and send the first data of the first type via the transceiver to one or more other wireless devices of the cluster, wherein sending the first data of the first type is responsive to a determination that the first wireless device has not received data of the first type from the one or more other wireless devices of the cluster subsequent to determining that the leader selection process has been initiated.

14. The first wireless device of claim 13, wherein the one or more processors are further configured to, subsequent to sending the first data of the first type:

acquire second data of the first type at the first wireless device; and send the first data of the first type via the transceiver to the one or more other wireless devices of the cluster.

15. The first wireless device of claim 13, wherein the one or more processors are further configured to send the first data of the first type from the first wireless device to a server via a wireless network.

16. The first wireless device of claim 13, wherein the one or more processors are further configured to, subsequent to sending the first data of the first type:

determine that a condition has been met by the first wireless device for relinquishing leadership; and responsive to determining that the condition has been met, indicate to the one or more other wireless devices of the cluster that the first wireless device is no longer leader regarding data of the first type for the cluster.

17. The first wireless device of claim 16, wherein, to determine that the condition has been met, the one or more processors are configured to determine:

at least one passing of a threshold duration of time, at least one battery level of the first wireless device falling below a threshold value, an inability of the first wireless devices to obtain subsequent data of the first type, subsequent data falls below at least one threshold quality value, the first wireless device is no longer connected to a wireless network, a Quality of Service (QOS) metric regarding a connection a wireless network has fallen below at least one threshold level, a condition related to at least one limitation of a wireless subscription of the first wireless device, or any combination thereof.

18. The first wireless device of claim 13, wherein, to send the first data of the first type, the one or more processors are configured to send data indicative of:

a position of the first wireless device, sensor data from one or more sensors of the first wireless device, contextual data for the first wireless device, or any combination thereof.

19. The first wireless device of claim 18, wherein the first wireless device further comprises the one or more sensors, and, to obtain the sensor data, the one or more sensors are configured to obtain data indicative of:

temperature, moisture, pressure, light, sound, movement, altitude, orientation, a fluid property, a detected chemical, a magnetic field, harvested energy, or any combination thereof.

20. The first wireless device of claim 18, wherein the first wireless device further comprises the one or more sensors, and, to obtain the sensor data, the one or more sensors are configured to obtain, for a set of sensor data values:

an average, a mean, a standard deviation, a maximum, a minimum, or a combination thereof.

21. The first wireless device of claim 18, wherein, to send data indicative of the position of the first wireless device, the one or more processors are configured to send data indicative of a coarse position fix.

22. The first wireless device of claim 13, wherein the one or more processors are further configured to receive data of a second type from a second wireless device of the cluster subsequent to determining that the leader selection process has been initiated.

23. The first wireless device of claim 13, wherein, to determine that the leader selection process has been initiated for the cluster of wireless devices, the one or more processors are configured to determine that the first wireless device has not received data of the first type from another wireless device of the cluster for at least one threshold duration of time.

24. The first wireless device of claim 13, wherein the one or more processors are configured to acquire the first data of the first type at the first wireless device further responsive to a determination that the first wireless device meets one or more leadership criteria.

25. An apparatus for cooperative data sharing among wireless devices, the apparatus comprising:

means for determining whether a leader selection process has been initiated regarding data of a first type for a cluster of wireless devices, wherein:

the cluster of wireless devices comprises a plurality of wireless devices in range of wireless communication with one another, and the cluster of wireless devices includes a first wireless device;

means for acquiring first data of the first type, responsive to the determination that the leader selection process has been initiated; and means for sending the first data of the first type from the first wireless device to one or more other wireless devices of the cluster, wherein sending the first data of the first type is responsive to a determination that the first wireless device has not received data of the first type from the one or more other wireless devices of the cluster subsequent to determining that the leader selection process has been initiated.

26. The apparatus of claim 25, further comprising:

means for acquiring second data of the first type, subsequent to sending the first data of the first type; and means for sending the first data of the first type to one or more other wireless devices of the cluster, subsequent to sending the first data of the first type.

27. The apparatus of claim 25, further comprising means for sending the first data of the first type from the first wireless device to a server via a wireless network.

28. The apparatus of claim 25, further comprising:

means for determining, subsequent to sending the first data of the first type, that a condition has been met by the first wireless device for relinquishing leadership; and means for, responsive to determining that the condition has been met, indicating to the one or more other wireless devices of the cluster that the first wireless device is no longer leader regarding data of the first type for the cluster.

29. The apparatus of claim 25, further comprising means for receiving data of a second type from a second wireless device of the cluster subsequent to determining that the leader selection process has been initiated.

30. A non-transitory computer-readable medium storing instructions for cooperative data sharing among wireless devices, the instructions comprising code for:

determining whether a leader selection process has been initiated regarding data of a first type for a cluster of wireless devices, wherein:

the cluster of wireless devices comprises a plurality of wireless devices in range of wireless communication with one another, and the cluster of wireless devices includes a first wireless device;

responsive to the determination that the leader selection process has been initiated, acquiring first data of the first type at the first wireless device; and sending the first data of the first type from the first wireless device to one or more other wireless devices of the cluster, wherein sending the first data of the first type is responsive to a determination that the first wireless device has not received data of the first type from the one or more other wireless devices of the cluster subsequent to determining that the leader selection process has been initiated.

\* \* \* \* \*